(12) United States Patent
Chen et al.

(10) Patent No.: US 12,437,412 B2
(45) Date of Patent: *Oct. 7, 2025

(54) DEEP NEURAL NETWORK FOR SEGMENTATION OF ROAD SCENES AND ANIMATE OBJECT INSTANCES FOR AUTONOMOUS DRIVING APPLICATIONS

(71) Applicant: NVIDIA Corporation, Santa Clara, CA (US)

(72) Inventors: Ke Chen, Sunnvale, CA (US); Nikolai Smolyanskiy, Seattle, WA (US); Alexey Kamenev, Bellevue, WA (US); Ryan Oldja, Redmond, WA (US); Tilman Wekel, Sunnyvale, CA (US); David Nister, Bellevue, WA (US); Joachim Pehserl, Lynnwood, WA (US); Ibrahim Eden, Redmond, WA (US); Sangmin Oh, San Jose, CA (US); Ruchi Bhargava, Redmond, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,921

(22) Filed: Dec. 27, 2023

(65) Prior Publication Data

US 2025/0014186 A1  Jan. 9, 2025

Related U.S. Application Data

(63) Continuation of application No. 16/938,706, filed on Jul. 24, 2020, now Pat. No. 12,051,206.

(Continued)

(51) Int. Cl.
*G06T 7/00* (2017.01)
*G05D 1/00* (2006.01)
(Continued)

(52) U.S. Cl.
CPC .............. *G06T 7/11* (2017.01); *G05D 1/0088* (2013.01); *G05D 1/81* (2024.01); *G06F 18/22* (2023.01);
(Continued)

(58) Field of Classification Search
CPC ..... G06T 7/11; G06T 7/10; G06T 5/50; G06T 2207/10028; G06T 2207/20084;
(Continued)

(56) References Cited

U.S. PATENT DOCUMENTS 7,035,463 B1 *  4/2006  Monobe ..................... G06T 7/11
                                                            382/292
9,098,754 B1     8/2015  Stout et al.
(Continued)

FOREIGN PATENT DOCUMENTS

CA       2934636 A1      1/2017
CN     106796718 A       5/2017
(Continued)

OTHER PUBLICATIONS

Notice of Allowance received for U.S. Appl. No. 17/895,940, mailed on Mar. 20, 2024, 9 pages.

(Continued)

*Primary Examiner* — Mahmoud S Ismail
(74) *Attorney, Agent, or Firm* — Freestone Intellectual Property Law PLLC

(57) ABSTRACT

A deep neural network(s) (DNN) may be used to perform panoptic segmentation by performing pixel-level class and instance segmentation of a scene using a single pass of the DNN. Generally, one or more images and/or other sensor data may be stitched together, stacked, and/or combined, and fed into a DNN that includes a common trunk and several heads that predict different outputs. The DNN may include a class confidence head that predicts a confidence map
(Continued)

representing pixels that belong to particular classes, an instance regression head that predicts object instance data for detected objects, an instance clustering head that predicts a confidence map of pixels that belong to particular instances, and/or a depth head that predicts range values. These outputs may be decoded to identify bounding shapes, class labels, instance labels, and/or range values for detected objects, and used to enable safe path planning and control of an autonomous vehicle.

20 Claims, 15 Drawing Sheets

Related U.S. Application Data

(60) Provisional application No. 62/878,659, filed on Jul. 25, 2019.

(51) Int. Cl.
| | | |
|---|---|---|
| *G05D 1/81* | (2024.01) | |
| *G06F 18/22* | (2023.01) | |
| *G06F 18/23* | (2023.01) | |
| *G06T 5/50* | (2006.01) | |
| *G06T 7/10* | (2017.01) | |
| *G06T 7/11* | (2017.01) | |
| *G06V 10/82* | (2022.01) | |
| *G06V 20/56* | (2022.01) | |
| *G06V 20/58* | (2022.01) | |
| *G06V 10/44* | (2022.01) | |

(52) U.S. Cl.
CPC ............ *G06F 18/23* (2023.01); *G06T 5/50* (2013.01); *G06T 7/10* (2017.01); *G06V 10/82* (2022.01); *G06V 20/56* (2022.01); *G06V 20/58* (2022.01); *G06T 2207/10028* (2013.01); *G06T 2207/20084* (2013.01); *G06T 2207/30252* (2013.01); *G06V 10/454* (2022.01)

(58) Field of Classification Search
CPC .......... G06T 2207/30252; G06V 20/58; G06V 10/82; G06V 20/56; G06V 10/454; G06F 18/23; G05D 1/81; G05D 1/0088
USPC .......................................................... 701/28
See application file for complete search history.

(56) References Cited

U.S. PATENT DOCUMENTS

| | | |
|---|---|---|
| 9,286,538 B1 | 3/2016 | Chen et al. |
| 10,593,042 B1 | 3/2020 | Douillard et al. |
| 10,809,361 B2 | 10/2020 | Vallespi-Gonzalez et al. |
| 10,824,862 B2 | 11/2020 | Qi et al. |
| 10,825,188 B1 | 11/2020 | Tan et al. |
| 10,860,034 B1 | 12/2020 | Ziyaee et al. |
| 10,885,698 B2 | 1/2021 | Muthler et al. |
| 10,915,793 B2 | 2/2021 | Corral-Soto et al. |
| 10,970,871 B2 | 4/2021 | Nezhadarya et al. |
| 11,062,454 B1 | 7/2021 | Cohen et al. |
| 11,380,108 B1 | 7/2022 | Cai et al. |
| 11,532,168 B2 | 12/2022 | Smolyanskiy et al. |
| 11,704,572 B1 | 7/2023 | Pronovost et al. |
| 11,727,601 B2 | 8/2023 | Marschner et al. |
| 11,762,094 B2 | 9/2023 | Laddha et al. |
| 11,768,292 B2 | 9/2023 | Liang et al. |
| 11,885,907 B2 | 1/2024 | Popov et al. |
| 2002/0147694 A1 | 10/2002 | Dempsey et al. |
| 2015/0036870 A1 | 2/2015 | Mundhenk et al. |
| 2016/0073080 A1 | 3/2016 | Wagner et al. |
| 2017/0023473 A1 | 1/2017 | Wegner et al. |
| 2017/0293837 A1 | 10/2017 | Cosatto et al. |
| 2017/0307735 A1 | 10/2017 | Rohani et al. |
| 2018/0101720 A1 | 4/2018 | Liu |
| 2018/0108134 A1 | 4/2018 | Venable et al. |
| 2018/0173971 A1 | 6/2018 | Jia et al. |
| 2018/0211403 A1 | 7/2018 | Hotson et al. |
| 2018/0247160 A1 | 8/2018 | Rohani et al. |
| 2018/0276845 A1 | 9/2018 | Bjorgvinsdottir et al. |
| 2018/0314253 A1 | 11/2018 | Mercep et al. |
| 2018/0349746 A1 | 12/2018 | Vallespi-Gonzalez |
| 2019/0026571 A1 | 1/2019 | Ryan |
| 2019/0026588 A1* | 1/2019 | Ryan ................. G06F 18/24133 |
| 2019/0026597 A1 | 1/2019 | Zeng et al. |
| 2019/0137287 A1 | 5/2019 | Pazhayampallil et al. |
| 2019/0145765 A1 | 5/2019 | Luo et al. |
| 2019/0147260 A1 | 5/2019 | May |
| 2019/0147331 A1 | 5/2019 | Arditi |
| 2019/0147610 A1 | 5/2019 | Frossard et al. |
| 2019/0258878 A1 | 8/2019 | Koivisto et al. |
| 2019/0279366 A1 | 9/2019 | Sick et al. |
| 2019/0286153 A1 | 9/2019 | Rankawat et al. |
| 2019/0324148 A1 | 10/2019 | Kim et al. |
| 2019/0361454 A1 | 11/2019 | Zeng et al. |
| 2020/0013219 A1* | 1/2020 | Dhua ......................... G06T 7/12 |
| 2020/0104584 A1 | 4/2020 | Zheng et al. |
| 2020/0174132 A1 | 6/2020 | Nezhadarya et al. |
| 2020/0175326 A1* | 6/2020 | Shen ..................... G05D 1/2465 |
| 2020/0193606 A1 | 6/2020 | Douillard et al. |
| 2020/0210721 A1 | 7/2020 | Goel et al. |
| 2020/0301013 A1* | 9/2020 | Banerjee ................ G01S 17/931 |
| 2021/0026355 A1 | 1/2021 | Chen et al. |
| 2021/0082181 A1 | 3/2021 | Shi et al. |
| 2021/0096241 A1 | 4/2021 | Bongio et al. |
| 2021/0109523 A1 | 4/2021 | Zou et al. |
| 2021/0146952 A1 | 5/2021 | Vora et al. |
| 2021/0149051 A1 | 5/2021 | Ding et al. |
| 2021/0166426 A1* | 6/2021 | Mccormac ........... G05D 1/2437 |
| 2021/0181758 A1 | 6/2021 | Das et al. |
| 2022/0327743 A1 | 10/2022 | Oh et al. |

FOREIGN PATENT DOCUMENTS

| | | |
|---|---|---|
| CN | 108171217 A | 6/2018 |
| CN | 108334081 A | 7/2018 |
| CN | 108596058 A | 9/2018 |
| CN | 109284764 A | 1/2019 |
| CN | 109291929 A | 2/2019 |
| CN | 109814130 A | 5/2019 |
| CN | 110032949 A | 7/2019 |
| CN | 110366710 A | 10/2019 |
| EP | 3525000 A1 | 8/2019 |
| WO | 2019178548 A1 | 9/2019 |

OTHER PUBLICATIONS

Object Detection and Classification by Decision-Level Fusion for Intelligent Vehicle Systems. Oh et al. (Year: 2016).
Office Action received for Chinese Patent Application No. 202011294650.3, mailed on Mar. 1, 2024, 24 pages (14 pages of Original OA and 10 pages of English Translation).
Office action received for Chinese Patent Application No. 202011297922.5, mailed on Mar. 16, 2024, 7 pages (2 pages English Translation and 5 pages of Original Copy).
Office Action received for European Application No. 20204403.8, mailed on Nov. 22, 2023, 8 pages.
Office Action received for European Application No. 20205868.1, mailed on Nov. 23, 2023, 9 pages.
Non-Final office action received for U.S. Appl. No. 17/377,064, mailed on Jan. 31, 2024, 9 pages.
Notice of Allowance received for U.S. Appl. No. 17/377,053, mailed on Feb. 14, 2024, 11 pages.
Office Action Appendix received for U.S. Appl. No. 17/377,053, mailed on Jan. 8, 2024, 2 pages.
European Office Action dated Nov. 23, 2023 in Application No. 20205868.1, 9 pages.
Non-Final Office Action, U.S. Appl. No. 18/493,452, Notification Date: Dec. 10, 2024, 51 pages.

(56) References Cited

OTHER PUBLICATIONS

Final Office Action, U.S. Appl. No. 17/377,064, Notification Date: Jun. 5, 2024, 10 pages.
Notice of Allowance, U.S. Appl. No. 17/976,581, Notification Date: May 31, 2024, 7 pages.
Notice of Allowance, U.S. Appl. No. 16/938,706, Notification Date: Jun. 12, 2024, 8 pages.
"Taxonomy and Definitions for Terms Related to Driving Automation Systems for On-Road Motor Vehicles", Society of Automotive Engineers (SAE), Standard No. J3016-201609, pp. 1-30 (Sep. 30, 2016).
"Taxonomy and Definitions for Terms Related to Driving Automation Systems for On-Road Motor Vehicles", Society of Automotive Engineers (SAE), Standard No. J3016-201806, pp. 1-35 (Jun. 15, 2018).
Chen, X., et al., "Multi-View 3D Object Detection Network for Autonomous Driving", Cornell University Library, pp. 1-9 {Nov. 23, 2016).
Daan, D. G., et al., "Single Network Panoptic Segmentation for Street Scene Understanding", 2019 IEEE Intelligent Vehicles Symposium (IV), Jun. 9, 2019, pp. 709-715.
Erhan, D., et al., "Scalable Object Detection using Deep Neural Networks", In Proceedings of the IEEE Conference on Computer Vision and Pattern Recognition (CVPR), IEEE, pp. 8 (2014).
Furukawa, H., "Deep learning for end-lo-end automatic target recognition from synthetic aperture radar imagery", IEICE, pp. 35-40 (2018).
He, K., et al., "Deep residual learning for image recognition", In Proceedings of the IEEE conference on computer vision and pattern recognition, pp. 770-778 (2016).
IEC 61508, "Functional Safety of Electrical/Electronic/Programmable Electronic Safety-related Systems," Retrieved from Internet URL: hllps://en.wikipedia.org/wiki/IEC_61508, accessed on Apr. 1, 2022, 7 pages.
ISO 26262, "Road vehicle—Functional safety," International Standard for Functional Safety of Electronic System, Retrieved from Internet URL: hllps://en.wikipedia.org/wiki/ISO_26262, accessed on Sep. 13, 2021, 8 pages.
Jayakrishnan Unnikrishan, et al. "Resolving Elevation Ambiguity in 1-D Radar Array Measurements Using Deep Learning", International Conference on Intelligent Robots and Systems, Macau, China, Nov. 4-8, 2019, 6 pages.
Kendall, A, et al., "Multi-task learning using uncertainty to weigh losses for scene geometry and semantics", In Proceedings of the IEEE Conference on Computer Vision and Pattern Recognition, pp. 7482-7491 (2018).
Kendall, A., & Gal, Y. (2017). What uncertainties do we need in bayesian deep learning for computer vision?. In Advances in neural information processing systems (pp. 5574-5584).
Kirillov, A, et al., "Panoptic Segmentation", In Proceedings of the IEEE Conference on Computer Vision and Pattern Recognition, pp. 1-10 (2019).
Krizhevsky, A, et al., "Imagenet classification with deep convolutional neural networks", In Advances in Neural Information Processing Systems, pp. 1-9 (2012).
Ku, J., et al., "Joint 3D Proposal Generation and Object Detection from View Aggregation", IEEE/RSJ International Conference on Intelligent Robots and Systems, pp. 1-8 {Oct. 2018).
Liu, H., et al., "An End-To-End Network for Panoptic Segmentation", IEEE/CVF Conference on Computer Vision and Pattern Recognition (CVPR), pp. 6165-6174 (2019).
Luo, W., et al., "Fast and Furious: Real Time End-to-End 3D Detection, Tracking and Motion Forecasting with a Single Convolutional Net", In Proceedings of the IEEE conference on Computer Vision and Pattern Recognition, pp. 3569-3577 (2018).
Nezhadarya Ehsan et al: "BoxNet: A Deep Learning Method for 2D Bounding Box Estimation from Bird's-Eye View Point Cloud", 2019 IEEE Intelligent Vehicles Symposium (IV), IEEE, Jun. 9, 2019, pp. 1557-1564, XP033606092, DOI: 10.1109/IVS.2019.8814058, [retrieved on Aug. 26, 2019] (Year: 2019).
Office Action received for Chinese Patent Application No. 202011272919.8, mailed on Dec. 29, 2023, 24 pages (12 pages of English Translation and 12 pages of Office Action).
Qi, C.R., et al., "PointNet: Deep Learning on Point Sets for 30 Classification and Segmentation", In Proceedings of the IEEE Conference on Computer Vision and Pattern Recognition, pp. 652-660 (2017).
Ronneberger, 0., et al., "U-net: Convolutional networks for biomedical image segmentation", In International Conference on Medical image computing and computer-assisted intervention, pp. 1-8 (2015).
Szegedy, C., et al., "Going Deeper with Convolutions", In Proceedings of the IEEE Conference on Computer Vision and Pattern Recognition (CVPR), pp. 1-9 (2015).
Wenquan, Z., et al., "LiSeg: Lightweight Road-object Semantic Segmentation in 3D LiDAR Scans For Autonomous Driving", 2018 IEEE Intelligent Vehicles Symposium (IV), IEEE, Jun. 26, 2018, pp. 1021-1026.
Xiong, Y., et al., "UPSNet: A Unified Panoptic Segmentation Network", IEEE/CVF Conference on Computer Vision and Pattern Recognition, pp. 8810-8818 (2019).
Zhou, Y., et al. "End-lo-End Multi-View Fusion for 3D Object Detection in LiDAR Point Clouds" Cornell University Library, pp. 1-10 {Oct. 2019).
Office Action received for Chinese Patent Application No. 202011272919.8, mailed on Jul. 16, 2024, 2024, 7 pages.
Notice of Allowance, U.S. Appl. No. 17/377,064, Notification Date: Aug. 7, 2024, 8 pages.
Final Office Action, U.S. Appl. No. 18/493,452, Notification Date: Feb. 25, 2025, 24 pages.
Non-Final Office Action, U.S. Appl. No. 18/482,183, Notification Date: Mar. 13, 2025, 8 pages.
Castorena, Juan, and Siddharth Agarwal. "Ground-edge-based LIDAR localization without a reflectivity calibration for autonomous driving." IEEE Robotics and Automation Letters 3.1 (2017): 344-351, 14 pages.
Lu, Weixin, et al. "L3-net: Towards learning based lidar localization for autonomous driving." Proceedings of the IEEE/CVF conference on computer vision and pattern recognition. 2019, 10 pages.
Non-Final Office Action, European Application No. 20 206 733.6-1207, Notification Date: Feb. 14, 2025, 7pages.
Shen, Xiaotong, Seong-Woo Kim, and Marcelo H. Ang. "Spatio-temporal motion features for laser-based moving objects detection and tracking." 2014 IEEE/RSJ International Conference on Intelligent Robots and Systems. IEEE, 2014, 7 pages.
Notice of Allowance, U.S. Appl. No. 18/493,452, Notification Date: Jun. 13, 2025, 13 pages.

\* cited by examiner

DEEP NEURAL NETWORK FOR SEGMENTATION OF ROAD SCENES AND ANIMATE OBJECT INSTANCES FOR AUTONOMOUS DRIVING APPLICATIONS

CROSS-REFERENCE TO RELATED APPLICATIONS

This application is a continuation of, and claims priority from, U.S. application Ser. No. 16/938,706, filed on Jul. 24, 2020, which claims the benefit of U.S. Provisional Application No. 62/878,659, filed on Jul. 25, 2019. The contents of each of the foregoing are incorporated by reference in their entirety.

BACKGROUND

Designing a system to safely drive a vehicle autonomously without supervision is tremendously difficult. An autonomous vehicle should at least be capable of performing as a functional equivalent of an attentive driver-who draws upon a perception and action system that has an incredible ability to identify and react to moving and static obstacles in a complex environment—to avoid colliding with other objects or structures along the path of the vehicle. Thus, the ability to detect instances of animate objects (e.g., cars, pedestrians, etc.) and other parts of an environment is often critical for autonomous driving perception systems. This capability has become increasingly important as the operational environment for the autonomous vehicle has begun to expand from highway environments to semi-urban and urban settings characterized by complex scenes with many occlusions and complex shapes.

Conventional autonomous vehicle perception stacks have used various perception techniques to detect actors in an environment. One prior approach involves the use of two separate Deep Neural Networks (DNNs), a first DNN that detects bounding boxes for animate objects, and a second DNN that regresses boundaries for static parts of the scene, such as a free space boundary. The other primary conventional approach involves using a first DNN to perform a full scene pixel segmentation, and using a second DNN to perform instance segmentation. One example of a prior instance segmentation DNN is Mask R-CNN, a two-stage detector that first proposes a number of candidate bounding boxes (e.g., 1000), and then looks for objects by performing object detection within the candidate bounding boxes.

These prior techniques have a number of drawbacks. For example, they are generally unreliable in cases of heavy occlusions, and may miss small and large objects. In addition, conventional boundary regressors are inflexible and have trouble handling complex scenes that have complicated shapes (e.g., lane entry/exit points, intersections) and occlusions. Furthermore, these prior techniques have limited accuracy since their individual parts are not trained together to parse the whole scene, and may not provide pixel-level predictions (as opposed to bounding boxes). As such, conventional perception techniques have limited accuracy in predicting object classification, dimensions, and orientation, and are often slow due to the usage of several DNNs.

SUMMARY

Systems and methods of the present disclosure use a deep neural network(s) (DNN) to perform panoptic segmentation by executing pixel-level class and instance segmentation of a scene using a single pass of the DNN. Generally, one or more images and/or other sensor data may be stitched together, stacked, and/or combined, and fed into a DNN that includes a common trunk and several heads that predict different outputs. The DNN may include a class confidence head that predicts a confidence map representing pixels that belong to particular classes, an instance regression head that predicts object instance data for detected objects, an instance clustering head that predicts a confidence map of pixels that belong to particular instances, and/or a depth head that predicts range values. These outputs may be decoded to identify bounding shapes, class labels, instance labels, and/or range values for detected objects. As such, the techniques described herein may be used to detect and classify instances of animate objects and/or parts of an environment, and these detections and classifications may be provided to an autonomous vehicle drive stack to enable safe path planning and control of an autonomous or semi-autonomous vehicle.

The present techniques may provide a variety of benefits over prior techniques. For example, by co-training multiple heads of a DNN together, the DNN may learn to detect and understand global characteristics of the entire scene more holistically, rather than focusing on local regions individually-a drawback of prior perception techniques for autonomous vehicles. Further, the present techniques may improve the ability of perception techniques to handle complex scenes that have complicated shapes and occlusions, where conventional boundary regressors struggle. This ability may be particularly important in autonomous driving applications, where road scenes change frequently, or may include a variety of unexpected shapes such as unusual cars, construction equipment, non-standard intersections, alleyways, pedestrians performing unusual movements or carrying objects, heavy traffic with lots of occlusion, and the like. Furthermore, by regressing instance location relative to a corner of each instance—as opposed to a centroid as in conventional techniques—the present techniques may improve the accuracy of instance regression—e.g., because corners of instances may be less likely to overlap, so pixels are more likely to be assigned to the correct instance. As such, the present techniques may result in more accurate detections that improve the ability to perform actions that lead to safer performance of the autonomous vehicle.

BRIEF DESCRIPTION OF THE DRAWINGS

The present systems and methods for segmentation of road scenes and animate object instances are described in detail below with reference to the attached drawing figures, wherein.

DETAILED DESCRIPTION

Figure 1:
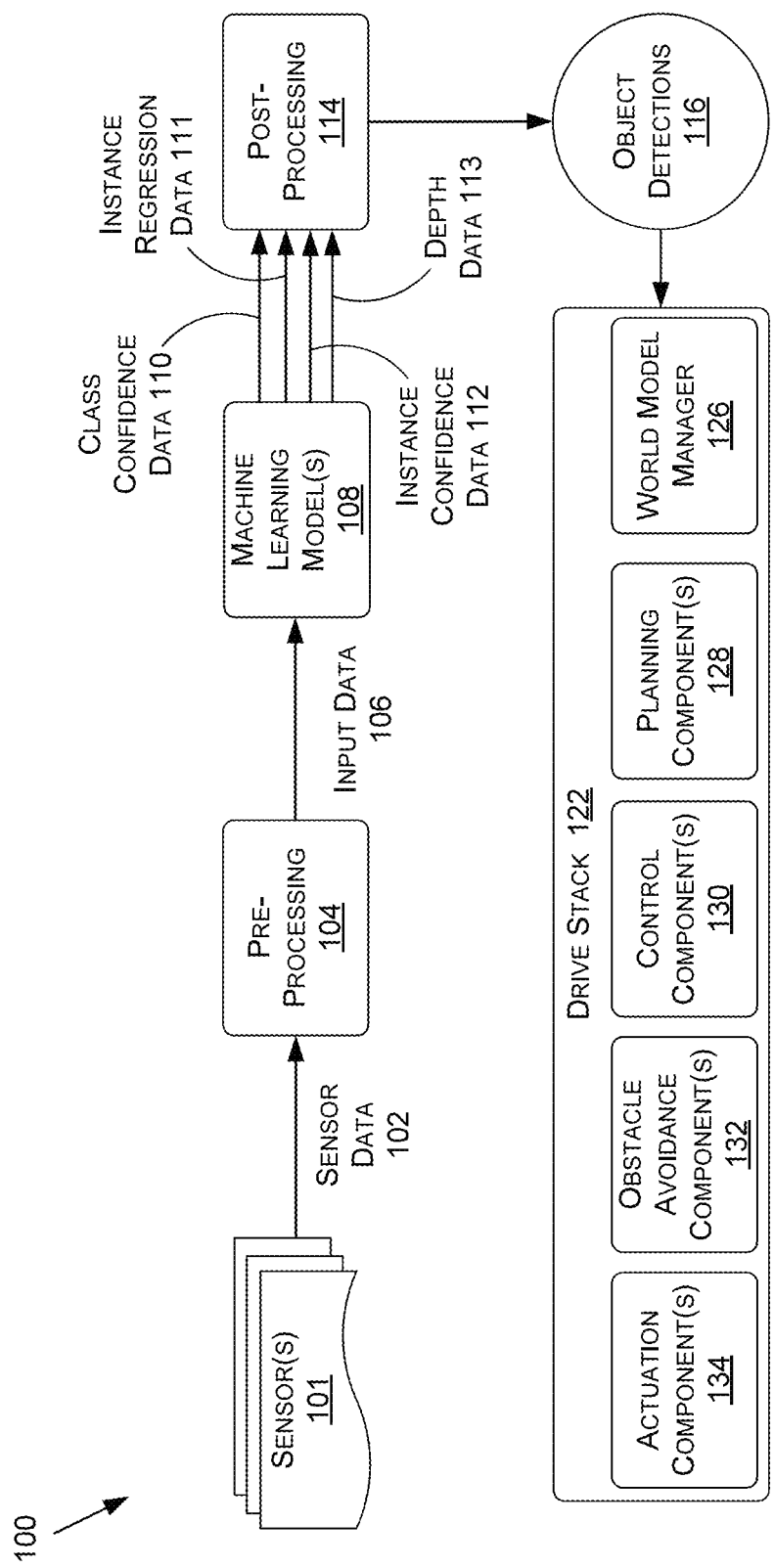
FIG. 1 is a data flow diagram illustrating an example process for an object detection system, in accordance with some embodiments of the present disclosure.

Systems and methods are disclosed relating to segmentation of road scenes and animate object instances using a deep neural network(s) (DNN). For example, the present disclosure describes systems and methods that use object detection techniques to identify or detect instances of obstacles (e.g., cars, trucks, pedestrians, cyclists, etc.) and other objects such as environmental parts, regions, or areas for use by autonomous vehicles, semi-autonomous vehicles, robots, and/or other object types.

Although the present disclosure may be described with respect to an example autonomous vehicle 1000 (alternatively referred to herein as "vehicle 1000" or "ego-vehicle 1000," an example of which is described herein with respect to FIGS. 10A-10D), this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to autonomous driving, this is not intended to be limiting. For example, the systems and methods described herein may be used in robotics (e.g., path planning for a robot), aerial systems (e.g., path planning for a drone or other aerial vehicle), boating systems (e.g., path planning for a boat or other water vessel), and/or other technology areas, such as for localization, path planning, and/or other processes.

At a high level, a DNN may be used to perform panoptic segmentation by performing pixel-level class and instance segmentation of a scene using, in embodiments, a single pass of a DNN. Generally, one or more images and/or other sensor data that captures a three dimensional (3D) environment may be stitched together, stacked, and/or otherwise combined, and fed into a DNN that includes a common trunk and several heads that predict different outputs. For example, the DNN may include a class confidence head that predicts a confidence map of objects being present and/or pixels belonging to certain classes of detected objects, an instance regression head that predicts object instance data (e.g., location, geometry, pose, orientation, etc.) for detected objects, an instance clustering head that predicts a confidence map of pixels belonging to a particular instance, and/or a depth head that predicts range values representing the distance from each pixel to an object represented by the pixel. These outputs may be decoded, filtered, and/or clustered to identify bounding shapes, class labels, instance labels, and/or range values for detected objects.

By way of non-limiting example, supported classes may include vehicles (e.g., cars, buses, trucks, etc.), vulnerable road users (e.g., motorcycles, cyclists, pedestrians, etc.), objects or elements of an environment (e.g., drivable or other navigable space, sidewalks, buildings, trees, poles, etc.), subclasses thereof (e.g., walking pedestrian), some combination thereof, and/or others. In an example application for autonomous vehicles, the DNN may be used to predict one or more bounding shapes for each detected object within a particular area(s) (e.g., on the road and/or sidewalk), a class label for each detected object, an instance label for each detected instance, a range or distance to each detected object, and/or a 2D mask demarcating a drivable or other navigable space, sidewalks, buildings, trees, poles, other static environmental parts, animate objects (e.g., cars, pedestrians, cyclists), and/or the like.

In some embodiments, the DNN may include one or more heads that predict different outputs. For example, a class confidence head may include a channel (e.g., classifier) for each class of object to be detected (e.g., vehicles, cars, trucks, vulnerable road users, pedestrians, cyclists, motorbikes, etc.), such that the class confidence head serves to perform one or more classifications, for example, by predicting a confidence map with each channel. Thus, the class confidence head may serve to predict classification data, which may take the form of a multi-channel tensor. For example, each channel may be thought of as a heat map with classification values (e.g., probability, score, or logit) that each pixel belongs to the class(es) corresponding to the channel.

In some embodiments, the DNN may include an instance regression head. The instance regression head may include N channels (e.g., classifiers), where each channel may regress a particular type of information about a detected object instance (e.g., from a particular class, for all classes, etc.), such as where the object is located (e.g., dx/dy vector pointing to a portion of the object such as the center or a corner), object height, object width, object orientation (e.g., rotation angle such as sine and/or cosine), some statistical measure thereof (e.g., minimum, maximum, mean, median, variance, etc.), and/or the like. Thus, the instance regression head may serve to predict instance regression data, which may take the form of a multi-channel tensor, where each channel regresses a particular type of object information such as a particular object dimension.

Additionally or alternatively, the DNN may include an instance clustering head that predicts one or more confidence maps representing pixels that belong to a particular instance. For example, the instance clustering head may include N channels (e.g., classifiers), where each channel predicts a confidence map representing classification values (e.g., probability, score, or logit) indicating whether each pixel belongs to a particular instance.

In some embodiments, in order to support detecting a larger number of instances than the number of channels, the instance regression head may predict a measure of whether each pixel belongs to each of a plurality of locally unique instances (e.g., occluded and/or neighboring instances), and a connected-component analysis may be performed on the predictions to distinguish among and detect boundaries for the locally unique instances, in each of a plurality of different regions. For example, while an entire scene may include some larger number of globally unique instances (e.g., 100), any particular cluster of pixels (local region) may belong to some smaller number of locally unique instances (e.g., 5-7). As such, the instance clustering head may include N channels (e.g., 5-7) corresponding to an expected or desired number of locally unique instances to distinguish, such that the instance clustering head predicts a depth-wise probability distribution per pixel representing the likelihood that each pixel belongs to a locally unique instance corresponding to each channel. In operation, the instance clustering head may predict N confidence maps (e.g., one per locally unique instance), a connected-component analysis may be performed on the N confidence maps to distinguish and detect boundaries for locally unique instances in each cluster (e.g., of connected instances), and the locally unique instances in each cluster may be identified and labeled with globally unique instance identifications (IDs). Accordingly, the instance clustering head may directly regress, cluster, and/or label unique instances.

As such, the techniques described herein may be used to detect and classify instances of animate objects and/or parts of an environment, and these detections and classifications may be provided to an autonomous vehicle drive stack to enable safe path planning and control of the semi-autonomous or autonomous vehicle. The present techniques may provide a variety of benefits over prior techniques. For example, by co-training multiple heads of a DNN together, the DNN may learn to detect and understand global characteristics of the entire scene more holistically, rather than focusing on local regions individually-a drawback of prior perception techniques for autonomous vehicles. Further, the present techniques may improve the ability of perception techniques to handle complex scenes that have complicated shapes and occlusions, where conventional boundary regressors struggle. This ability may be particularly important in autonomous driving applications, where road scenes change frequently, or may include a variety of unexpected shapes such as unusual cars, construction equipment, non-standard intersections, alleyways, pedestrians performing unusual movements or carrying objects, heavy traffic with lots of occlusion, and the like. Furthermore, by regressing instance location relative to a corner of each instance—as opposed to a centroid as in conventional techniques—the present techniques may improve the accuracy of instance regression— e.g., because corners of instances may be less likely to overlap, so pixels are more likely to be assigned to the correct instance. As such, the present techniques may result in more accurate detections that improve the ability to perform actions that lead to safer performance of the autonomous vehicle.

Example Object Detection System

With reference to FIG. 1, FIG. 1 is a data flow diagram illustrating an example process 100 for an object detection system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

At a high level, the process 100 may include a machine learning model(s) 108 configured to detect objects, such as instances of animate objects and/or parts of an environment, based on sensor data 102 of a three dimensional (3D) environment. The sensor data 102 may be pre-processed (e.g., via pre-processing 104) into input data 106 with a format that the machine learning model(s) 108 supports, and the input data 106 may be fed into the machine learning model(s) 108 to detect objects in the 3D environment (e.g., the object detections 116). Generally, the machine learning model(s) 108 may predict a representation of confidence that pixels belong to object class(es) (e.g., class confidence data 110), a representation of object instance data for instance(s) of detected objects (e.g., instance regression data 111), a representation of confidence that pixels belong to a particular instance (e.g., instance confidence data 112), and/or a representation of the distance from each pixel to an object represented by the pixel (e.g., depth data 113). In some embodiments, the machine learning model(s) 108 may include a common trunk and multiple heads that predict the different types of outputs. The output(s) of the machine learning model(s) 108 may be post-processed (e.g., via post-processing 114) into the object detections 116, which may comprise bounding boxes, closed polylines, or other bounding shapes identifying the locations, sizes, and/or orientations of the detected objects. The object detections 116 may correspond to obstacles around an autonomous vehicle, static environmental parts, and/or other objects, and may be used by control component(s) of the autonomous vehicle (e.g., controller(s) 1036, ADAS system 1038, SOC(s) 1004, software stack 122, and/or other components of the autonomous vehicle 1000 of FIGS. 10A-10D) to aid the autonomous vehicle in performing one or more operations (e.g., obstacle avoidance, path planning, mapping, etc.) within an environment.

Generally, object detection may be performed using sensor data 102 from any number and any type of sensor, such as, without limitation, one or more cameras, LiDAR sensors, RADAR sensors, and/or other sensor types such as those described below with respect to the autonomous vehicle 1000 of FIGS. 10A-10D. For example, the sensor(s) 101 may include one or more sensor(s) 101 of an ego-object or ego-actor-such as stereo camera(s) 1068, wide-view camera(s) 1070 (e.g., fisheye cameras), infrared camera(s) 1072, surround camera(s) 1074 (e.g., 360 degree cameras), and/or long-range and/or mid-range camera(s) 1098 of the autonomous vehicle 1000 of FIGS. 10A-10D—and the sensor(s) 101 may be used to generate sensor data 102 representing objects in the 3D environment around the ego-object.

In an example embodiment, the sensor(s) 101 may include one or more cameras, and the sensor data 102 may include one or more images captured by the one or more cameras. In some embodiments, the sensor data 102 may be pre-processed (e.g., via pre-processing 104) in various ways. In some embodiments, a single image (e.g., an RBG image) captured by a single camera may be used as the input data 106 (e.g., with or without pre-processing). In some cases, pre-processing 104 may include generating a composite image (e.g., an RBG image) by stitching together images captured by multiple cameras, and the composite image may be used as the input data 106. Any known image stitching technique may be used, for example, to combine multiple images with overlapping fields of view. Example image stitching techniques may involving identifying one or more correspondences between images, alignments of or between one or more images, warping of one or more images, transformations of one or more images, and/or blending of one or more images.

Generally, the input data 106 may include any number of channels (e.g., of a corresponding input tensor). For example, in some cases, an image may be used as a single channel input into the machine learning model(s) 108. In some cases, pre-processing 104 may be applied to encode, populate, or otherwise identify multiple channels of an input tensor. For example, an RGB image may be split into its constituent color channels and used as corresponding channels of input tensor. Additionally or alternatively, different images (e.g., images captured by different cameras, a sequence or time-series of images captured over time, etc.) may be stacked into corresponding channels of an input tensor.

In some cases, the input data 106 may additionally or alternatively include data from other sensors besides a camera(s). For example, in some embodiments, image data from one or more cameras may be supplemented with data from some other sensor modality, such as one or more LiDAR or RADAR sensors. Generally, data from different sensor modalities may be combined at creation/collection/generation (e.g., early fusion) and/or at some later time (e.g., late fusion). As such, in some cases, pre-processing 104 may include combining sensor data from different modalities. In an example embodiment, raw sensor data (e.g., the sensor data 102) from one or more LiDAR or RADAR sensors (e.g., the sensor(s) 101) may be subject to pre-processing 104 to derive range data, which may be encoded into at least a portion of the input data 106 (e.g., into a corresponding channel of an input tensor). In this example, the input data 106 may include one or more channels storing image data, and one or more channels storing other data such as range data (e.g., corresponding to the image data).

More specifically, firmware associated with a particular LiDAR or RADAR sensor(s) may be used to control the sensor(s) to emit light waves (for LiDAR) or radio waves (for RADAR) and detect reflections off of objects and materials in the environment to capture and/or process the sensor data 102. The sensor data 102 may include raw sensor data, point cloud data (e.g., LiDAR and/or RADAR point cloud data), and/or reflection data processed into some other format. Depending on the type of sensor, reflection data may include bearing, azimuth, elevation, range (e.g., time of beam flight), intensity, Doppler velocity, RADAR cross section (RCS), reflectivity, SNR, and/or the like. Generally, reflections and reflection characteristics may depend on the objects in the environment, speeds, materials, sensor mounting position and orientation, etc. In some cases, reflection data may be combined with position and orientation data (e.g., from GNSS and IMU sensors) to form a point cloud representing detected reflections from the environment. Each detection in the point cloud may include a three dimensional location of the detection and metadata about the detection such as one or more of the reflection characteristics.

Generally, the sensor data 102 may be subject to pre-processing 104 to generate the input data 106. In some embodiments, pre-processing 104 may include accumulating the sensor data 102 (e.g., over time, from multiple sensors with different locations/orientations on an ego-actor/vehicle), transforming the sensor data 102 to a single coordinate system (e.g., centered around the ego-actor/vehicle), ego-motion-compensating the sensor data 102 (e.g., to a latest known position of the ego-actor/vehicle), and/or projecting the sensor data 102 to form a projection image of a desired size (e.g., spatial dimension).

For example, the sensor data 102 may be accumulated from multiple sensors, such as some or all of a plurality of surrounding sensors from different locations of the autonomous vehicle 1000, and may be transformed to a single vehicle coordinate system (e.g., centered around the vehicle). Additionally or alternatively, the sensor data 102 may be accumulated over time in order to increase the density of the accumulated sensor data. Sensor detections may be accumulated over any desired window of time (e.g., 0.5 seconds(s), 1 s, 2 s, etc.). The size of the window may be selected based on the sensor and/or application (e.g., smaller windows may be selected for noisy applications such as highway scenarios). As such, each input into the machine learning model(s) 108 may be generated from accumulated detections from each window of time from a rolling window (e.g., from a duration spanning from t-window size to present). Each window to evaluate may be incremented by any suitable step size, which may but need not correspond to the window size. Thus, each successive input into the machine learning model(s) 108 may be based on successive windows, which may but need not be overlapping.

In another example, ego-motion compensation may be applied to sensor data 102 such as LiDAR data, RADAR data, and/or a sequence or time-series of images captured over time. For example, accumulated detections may be ego-motion-compensated to the latest known vehicle position. More specifically, locations of older detections may be propagated to a latest known position of the moving vehicle, using the known motion of the vehicle to estimate where the older detections will be located (e.g., relative to the present location of the vehicle) at a desired point in time (e.g., the current point in time). The result may be a set of accumulated, ego-motion compensated sensor data 102 (e.g., a point cloud) for a particular time slice.

In another example, pre-processing 104 may include projecting the sensor data 102, such as an (accumulated, ego-motion-compensated) LiDAR and/or RADAR point cloud, to form a projection image such as range image with a perspective view. Any suitable perspective projection may be used (e.g., spherical, cylindrical, pinhole, etc.). In some cases, the type of projection may depend on the type of sensor. By way of non-limiting example, for spinning sensors, a spherical or cylindrical projection may be used. In some embodiments, for a time-of-flight camera (e.g., Flash-LiDAR), a pinhole projection may be used. In some cases where sensor data from different sensor modalities is combined, the sensor data from the different sensor modalities may be processed into a common view. For example, in embodiments that combine images from one or more cameras and range data derived from a LiDAR and/or RADAR point cloud, the LiDAR and/or RADAR point cloud may be projected to form a range image with a perspective view that corresponds to the view represented by the one or more images. As such, a range image and/or corresponding range data may be used as at least a portion of the sensor data 102, for example, by encoding or otherwise storing a representation of the range data in a corresponding channel of a tensor.

In some cases, images with the same or different views may be generated, with each image being input into a separate channel of the machine learning model(s) 108. By way of non-limiting example, different sensor(s) 101 (whether the same type or a different of sensor) may be used to generate image data (e.g., LiDAR range image, camera images, etc.) having the same (e.g., perspective) view of the environment in a common image space, and image data from different sensor(s) 101 or sensor modalities may be stored in separate channels of a tensor. Since image data may be evaluated as an input to the machine learning model(s) 108, there may be a tradeoff between prediction accuracy and computational demand. As such, a desired spatial dimension for an image may be selected as a design choice.

Additionally or alternatively, other pre-processing 104 techniques may implemented. For example, in some cases, the sensor data 102 (e.g., one or more images) may be analyzed to determine characteristics such as optical flow, and a representation of the optical flow (e.g., optical flow vectors) may be used as at least a portion of the input data 106 (e.g., stored in a corresponding channel of an input tensor). Other types of pre-processing techniques are known and contemplated within the scope of the present disclosure. In any event, one or more images, range data, reflection data, optical flow data, and/or other data may be stored and/or encoded into a suitable representation (e.g., stored in corresponding channels of the input data 106), which may serve as the input into the machine learning model(s) 108. As such, the input data 106 (e.g., one or more images) may include multiple layers, with pixel values for the different layers storing different data (e.g., values representative of color, intensity, range, reflection characteristics, and/or other types).

In some embodiments, for each pixel that bins (e.g., aggregates) sensor data representing multiple reflections, a set of features may be calculated, determined, or otherwise selected from reflection characteristics of the reflections (e.g., bearing, azimuth, elevation, range, intensity, reflectivity, SNR, etc.). In some cases, when sensor data representing multiple reflections is binned together in a pixel of a projection image (e.g., a range image), sensor data representing one of the reflections (e.g., the reflection with the closest range) may be represented in the projection image and the sensor data representing the other reflections may be dropped. For example, in a range image with a pixel that bins multiple reflections together, the pixel may store a range value corresponding to the reflection with the closest range. Additionally or alternatively, when there are multiple reflections binned together in a pixel, thereby forming a tower of points, a particular feature for that pixel may be calculated by aggregating a corresponding reflection characteristic for the multiple overlapping reflections (e.g., using standard deviation, average, etc.). Generally, any given pixel may have multiple associated features values, which may be stored in corresponding channels of a tensor. In any event, the sensor data 102 may be encoded into a variety of types of the input data 106 (e.g., an image(s) captured by a camera(s), a projection image such as a range image, a tensor encoding image and range data, etc.), and the input data 106 may serve as the input into machine learning model(s) 108.

At a high level, the machine learning model(s) 108 may detect objects such as instances of obstacles, static parts of the environment, and/or other objects represented in the input data 106 (e.g., a camera image, and/or other sensor data stacked into corresponding channels of an input tensor). For example, the machine learning model(s) 108 may extract classification data representing pixels that belong to certain classes of detected objects (e.g., the class confidence data 110), object instance data such as location, geometry, and/or orientation data for detected objects (e.g., the instance regression data 111), classification data representing pixels that belong to certain instances of detected objects (e.g., instance confidence data 112), and/or range values representing distances to detected objects (e.g., the depth data 113). Any or all of these data may be post-processed (e.g., via post-processing 114) to identify bounding shapes, class labels, instance labels, and/or range data for detected objects.

In some embodiments, the machine learning model(s) 108 may be implemented using a DNN, such as a convolutional neural network (CNN). Although certain embodiments are described with the machine learning model(s) 108 being implemented using neural network(s), and specifically CNN(s), this is not intended to be limiting. For example, and without limitation, the machine learning model(s) 108 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 2:
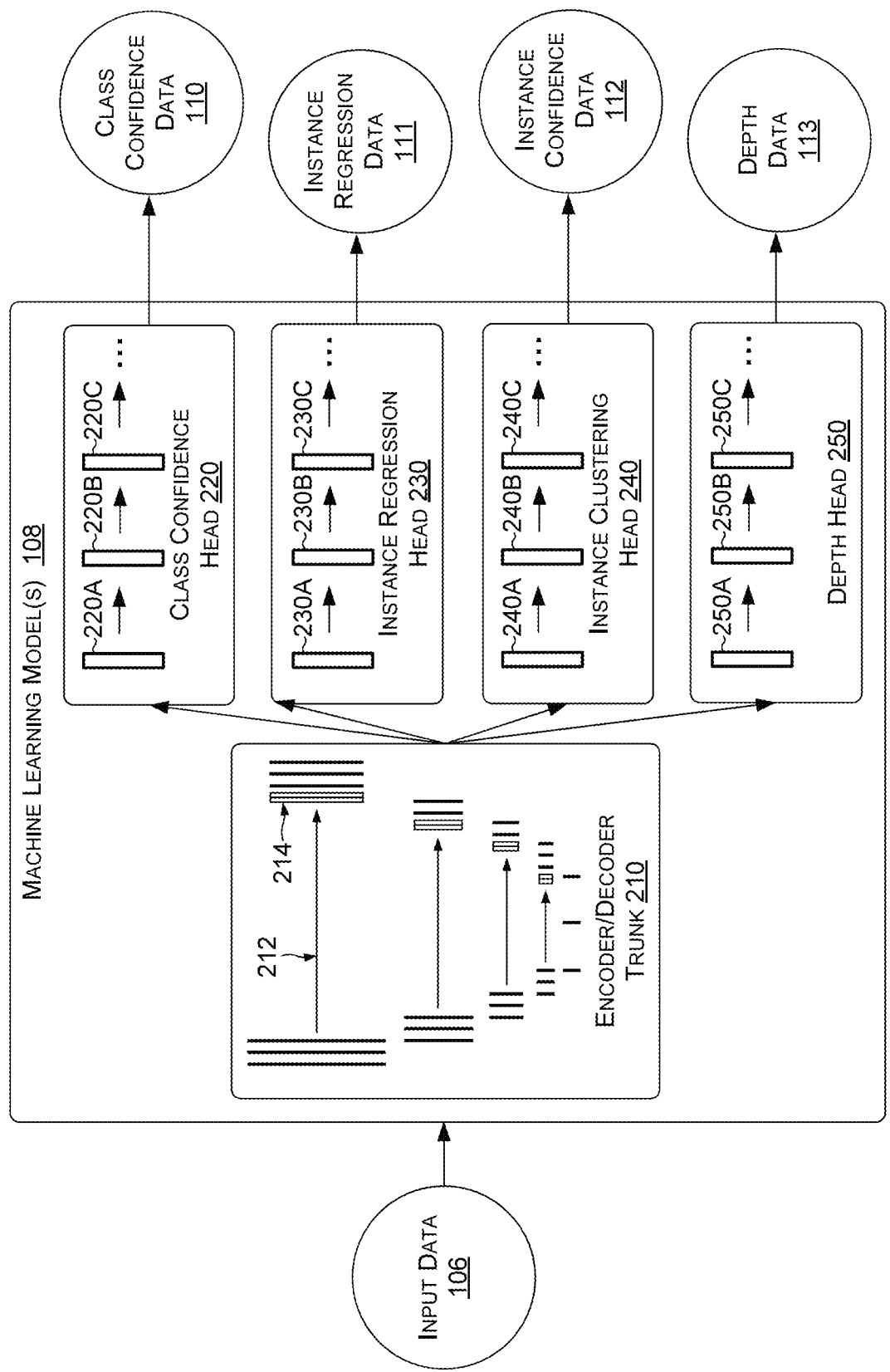
FIG. 2 is an illustration of an example machine learning model(s), in accordance with some embodiments of the present disclosure.

Generally, the machine learning model(s) 108 may include a common trunk (or stream of layers) with one or more heads (or at least partially discrete streams of layers) for predicting different outputs based on the input data 106. For example, the machine learning model(s) 108 may include, without limitation, a feature extractor (e.g., a DNN, an encoder/decoder, etc.) including convolutional layers, pooling layers, and/or other layer types, where the output of the feature extractor is provided as input to each of a plurality of heads that predict different outputs. The different heads may receive parallel inputs, in some examples, and thus may produce different outputs from similar input data. In the example of FIG. 2, the machine learning model(s) 108 is illustrated with an example architecture that extracts features from the input data 106 and executes class segmentation and/or instance regression on the extracted features. More specifically, machine learning model(s) 108 of FIG. 2 includes an encoder/decoder trunk 210, a class confidence head 220, an instance regression head 230, an instance clustering head 240, and/or a depth head 250.

The encoder/decoder trunk 210 may be implemented using encoder and decoder components with skip connections (e.g., similar to a Feature Pyramid Network, U-Net, etc.). For example, the encoder/decoder trunk 210 may accept the input data 106 (e.g., an image and/or an input tensor) and apply various convolutions, pooling, and/or other types of operations to extract features into some latent space. In FIG. 2, the encoder/decoder trunk 210 is illustrated with an example implementation involving an encoding (contracting) path down the left side and an example decoding (expansive) path up the right. Along the contracting path, each resolution may include any number of layers (e.g., convolutions, dilated convolutions, inception blocks, etc.) and a downampling operation (e.g., max pooling). Along the expansive path, each resolution may include any number of layers (e.g., deconvolutions, upsampling followed by convolution(s), and/or other types of operations). In the expansive path, each resolution of a feature map may be upsampled and concatenated (e.g., in the depth dimension) with feature maps of the same resolution from the contracting path. In this example, corresponding resolutions of the contracting and expansive paths may be connected with skip connections (e.g., skip connection 212), which may be used to add or concatenate feature maps from corresponding resolutions (e.g., forming concatenated feature map 214). As such, the encoder/decoder trunk 210 may extract features into some latent space tensor, which may be input into the class confidence head 220, the instance regression head 230, the instance clustering head 240, and/or the depth head 250.

The class confidence head 220 may include any number of layers 220A, 220B, 220C (e.g., convolutions, pooling, classifiers such as softmax, and/or other types of operations, etc.) that predict classification data from the output of the encoder/decoder trunk 210. For example, the class confidence head 220 may include a channel (e.g., a stream of layers plus a classifier) for each class of object to be detected (e.g., vehicles, cars, trucks, vulnerable road users, pedestrians, cyclists, motorbikes, drivable or other navigable space, sidewalks, buildings, trees, poles, subclasses thereof, some combination thereof, etc.), such that the class confidence head 220 extracts classification data (e.g., the class confidence data 110) in any suitable form. For example, the class confidence head 220 may predict a confidence map that represents an inferred confidence level of whether a particular object is present (regardless of class), separate confidence maps for each class, and/or the like. In some embodiments, the class confidence data 110 predicted by the class confidence head 220 may take the form of a multi-channel tensor where each channel may be thought of as a heat map storing classification values (e.g., probability, score, or logit) that each pixel belongs to a class(es) corresponding to the channel.

The instance regression head 230 may include any number of layers 230A, 230B, 230C (e.g., convolutions, pooling, classifiers such as softmax, and/or other types of operations, etc.) that predict object instance data (such as location, geometry, and/or orientation of detected objects) from the output of the encoder/decoder trunk 210. The instance regression head 230 may include N number of channels (e.g., streams of layers plus a classifier), where each channel regresses a particular type of information about a detected object instance, such as where the object is located (e.g., dx/dy vector pointing to the center or a corner of the object), object height, object width, object orientation (e.g., rotation angle such as sine and/or cosine), some statistical measure thereof (e.g., minimum, maximum, mean, median, variance, etc.), and/or the like. By way of non-limiting example, instance regression head 230 may include separate dimensions identifying the x-dimension of a point of a detected object (e.g., a corner, a centroid, etc.), the y-dimension of the point of a detected object, the width of a detected object, the height of a detected object, the sine of the orientation of a detected objected (e.g., a rotation angle in 2D image space), the cosine of the orientation of a detected object, and/or other types of information. These types of object instance data are meant merely as an example, and other types of object information may additionally or alternatively be regressed and/or otherwise predicted. The instance regression head 230 may include separate regression channels for each class, or one set of channels for all classes. In some embodiments, the instance regression data 111 predicted by the instance regression head 230 may take the form of a multi-channel tensor where each channel may include floating-point numbers that regress a particular type of object information such as a particular object dimension.

The instance clustering head 240 may include any number of layers 240A, 240B, 240C (e.g., convolutions, pooling, classifiers such as softmax, and/or other types of operations, etc.) that predict classification data from the output of the encoder/decoder trunk 210. For example, the instance clustering head 240 may include a channel (e.g., a stream of layers plus a classifier) for each unique instance (e.g., of objects of a particular class or group of classes) to be detected, and/or for each of a plurality of locally unique instances (e.g., occluded and/or neighboring instances) to distinguish among. Generally, each channel may predict a measure of whether a particular pixel belongs to a (locally) unique instance, such that the instance clustering head 240 extracts classification data (e.g., the instance confidence data 112) in any suitable form. For example, the instance clustering head 240 (e.g., each channel of the instance clustering head 240) may predict a confidence map that represents an inferred confidence level indicating pixels that belong to a particular instance. In some embodiments, the instance confidence data 112 predicted by the instance clustering head 240 may take the form of a multi-channel tensor where each channel may be thought of as a heat map storing classification values (e.g., probability, score, or logit) that each pixel belongs to a particular instance (or locally unique instance) corresponding to the channel.

The depth head 250 may include any number of layers 250A, 250B, 250C (e.g., convolutions, pooling, classifiers such as softmax, and/or other types of operations, etc.) that predict range values from the output of the encoder/decoder trunk 210. The range values may represent the distance from each pixel to an object represented by the pixel. As such, the depth head 250 may comprise a channel (e.g., a stream of layers plus a classifier) that regresses distance from pixel to object (e.g., the depth data 113). In some embodiments, the depth data 113 predicted by the depth head 250 may take the form of depth map that includes floating-point numbers that regress the distance to each detected object.

As such, the machine learning model(s) 108 may predict multi-channel classification data (e.g., the class confidence data 110, the instance confidence data 112), multi-channel object instance data (e.g., the instance regression data 111), and/or a depth map (e.g., the depth data 113) from a particular input (e.g., the input data 106). Some possible training techniques are described in more detail below. In operation, the outputs of the machine learning model(s) 108 may be decoded (e.g., via post-processing 114) to identify bounding shapes identifying the locations, geometry, and/or orientations of detected objects, class labels for detected objects, instance labels for detected objects, and/or range to detected objects. In some embodiments, since object instance data may be noisy and/or may produce multiple candidates, bounding shapes may be generated using non-maximum suppression, density-based spatial clustering of application with noise (DBSCAN), and/or another function.

Figure 3:
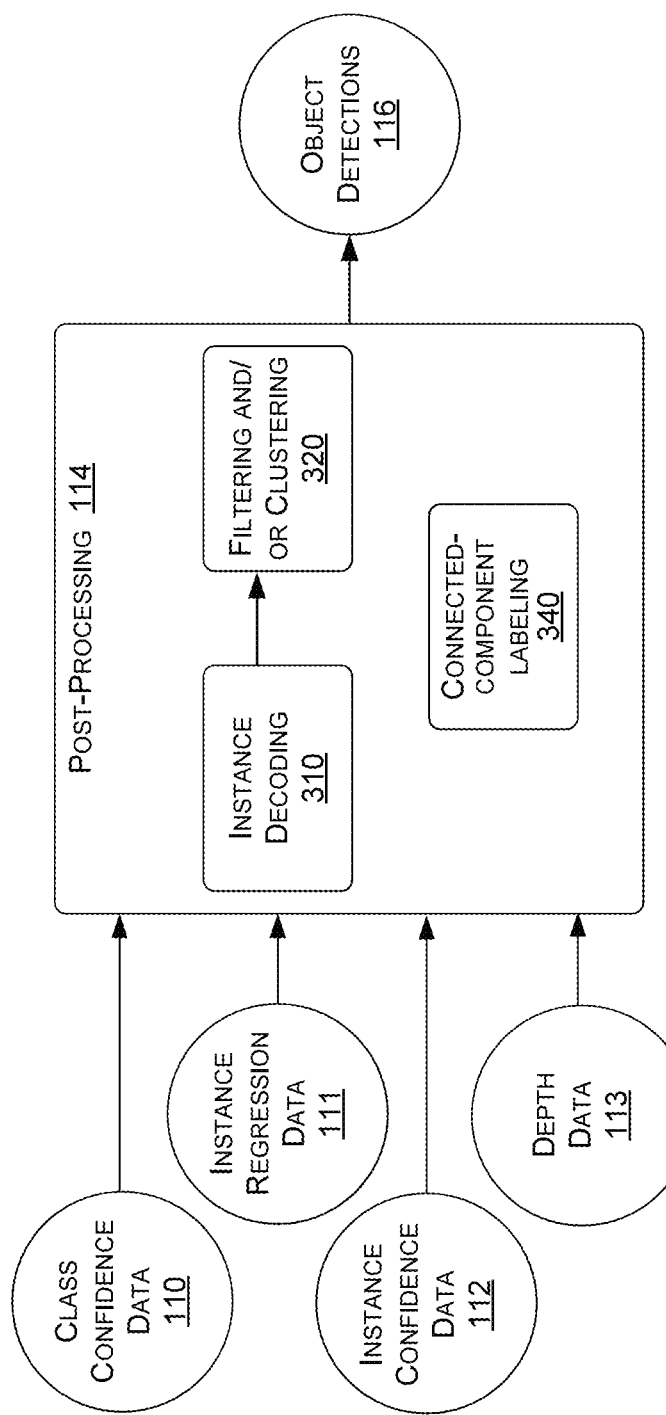
FIG. 3 is a data flow diagram illustrating an example post-processing process for generating object detections in an object detection system, in accordance with some embodiments of the present disclosure.

FIG. 3 is a data flow diagram illustrating an example post-processing 114 process for generating object detections 116 in an object detection system, in accordance with some embodiments of the present disclosure. In some embodiments, the post-processing 114 may include instance decoding 310 and filtering and/or clustering 320. Generally, the instance decoding 310 may identify candidate bounding boxes (or other bounding shapes) (e.g., for each object class) based on object instance data (e.g., location, geometry, and/or orientation data) from the corresponding channels of the instance regression data 111 and/or a confidence map or mask from a corresponding channel of classification data (e.g., the class confidence data 110) for that class. More specifically, a predicted confidence map and predicted object instance data may specify information about detected object instances, such as where the object is located, object height, object width, object orientation, and/or the like. This information may be used to identify candidate object detections (e.g., candidates having a unique center point, object height, object width, object orientation, and/or the like). The result may be a set of candidate bounding boxes (or other bounding shapes) for each object class.

Various types of filtering and/or clustering 320 may be applied to remove duplication and/or noise from the candidate bounding boxes (or other bounding shapes) for each object class. For example, in some embodiments, duplicates may be removed using non-maximum suppression. Non-maximum suppression may be used where two or more candidate bounding boxes have associated confidence values that indicate the candidate bounding boxes may correspond to the same object instance. In such examples, the confidence value that is the highest for the object instance may be used to determine which candidate bounding box to use for that object instance, and non-maximum suppression may be used to remove, or suppress, the other candidates.

For example, each candidate bounding box (or other bounding shape) may be associated with a corresponding confidence/probability value associated with one or more corresponding pixels from a corresponding channel of the class confidence data 110 for the class being evaluated (e.g., using the confidence/probability value of a representative pixel such as a center pixel, using an averaged or some other composite value computed over the candidate region, etc.). Thus, candidate bounding shapes that have a confidence/probability of being a member of the object class less than some threshold (e.g., 50%) may be filtered out. Additionally or alternatively, a candidate bounding box (or other shape) with the highest confidence/probability score for a particular class may be assigned an instance ID, a metric such as intersection over union (IoU) may be calculated with respect to each of the other candidates in the class, and candidates having an IoU above some threshold may be filtered out to remove duplicates. The process may be repeated, assigning the candidate having the next highest confidence/probability score an instance ID, removing duplicates, and repeating until there are no more candidates remaining. The process may be repeated for each of the other classes to remove duplicate candidates.

In some embodiments, a clustering approach such as density-based spatial clustering of applications with noise (DBSCAN) may be used to remove duplicate candidate bounding shapes. For example, candidate bounding shapes may be clustered (e.g., the centers of the candidate bounding shapes may be clustered), candidates in each cluster may be determined to correspond to the same object instance, and duplicate candidates from each cluster may be removed.

As such, the extracted classification data and/or object instance data may be decoded (e.g., via instance decoding 310), filtered and/or clustered (e.g., via filtering and/or clustering 320) to identify bounding boxes, closed polylines, or other bounding shapes for detected objects in each particular class (e.g., based on data from corresponding channels of class confidence data 110 and instance regression data 111). A class label may be applied to each identified bounding shape based on the particular class being evaluated (e.g., based on a known mapping between channels and class labels). In some embodiments, a range value may be applied to each identified bounding shape, for example, using the depth data 113 (e.g., by identifying a value corresponding to a representative pixel such as the centroid of the object identified by the bounding shape, by identifying a representative value such as a closest range associated with the pixels of the object identified by the bounding shape, by determining some statistical measure of range values for pixels of the object, etc.). Generally, the identified bounding shapes may correspond to detected objects in any number of classes. In some embodiments, detected objects in a particular class or group of classes (e.g., vehicles, vulnerable road users, environmental parts, subclasses thereof, etc.) may be identified (e.g., by identifying bounding shapes with the same class label), and each unique instance may be assigned a unique instance label. As such, bounding shapes, class labels, range values, and/or instance labels may be identified for detected objects.

In embodiments that include the instance clustering head 240, the post-processing 114 may include a connected-component labeling 340 process to decode the instance regression data 111. For example, the instance clustering head 240 may predict a confidence map (e.g., per channel) that represents classification values (e.g., probability, score, or logit) indicating whether each pixel belongs to a particular instance. Thus, the instance clustering head 240 may predict a depth-wise probability distribution per pixel representing the likelihood that each pixel belongs to an object instance corresponding to each channel. Where each channel is assigned to identify a single instance, a connected-component analysis (e.g., connected-component labeling 340) may be performed on each confidence map to identify a region of the map corresponding to the instance (e.g., by filtering out pixels with classification values below a threshold, clustering remaining pixels, applying smoothing, etc.). In some scenarios, a single instance might be occluded in a manner that splits the instance into two distinct connected regions (e.g., an instance that is partially occluded by a pole). As such, in some embodiments, distinct connected regions that are split in a particular manner (e.g., split substantially symmetrically, split by a gap or hole smaller than a threshold distance, etc.) may be joined to form a single composite region.

Figure 4:
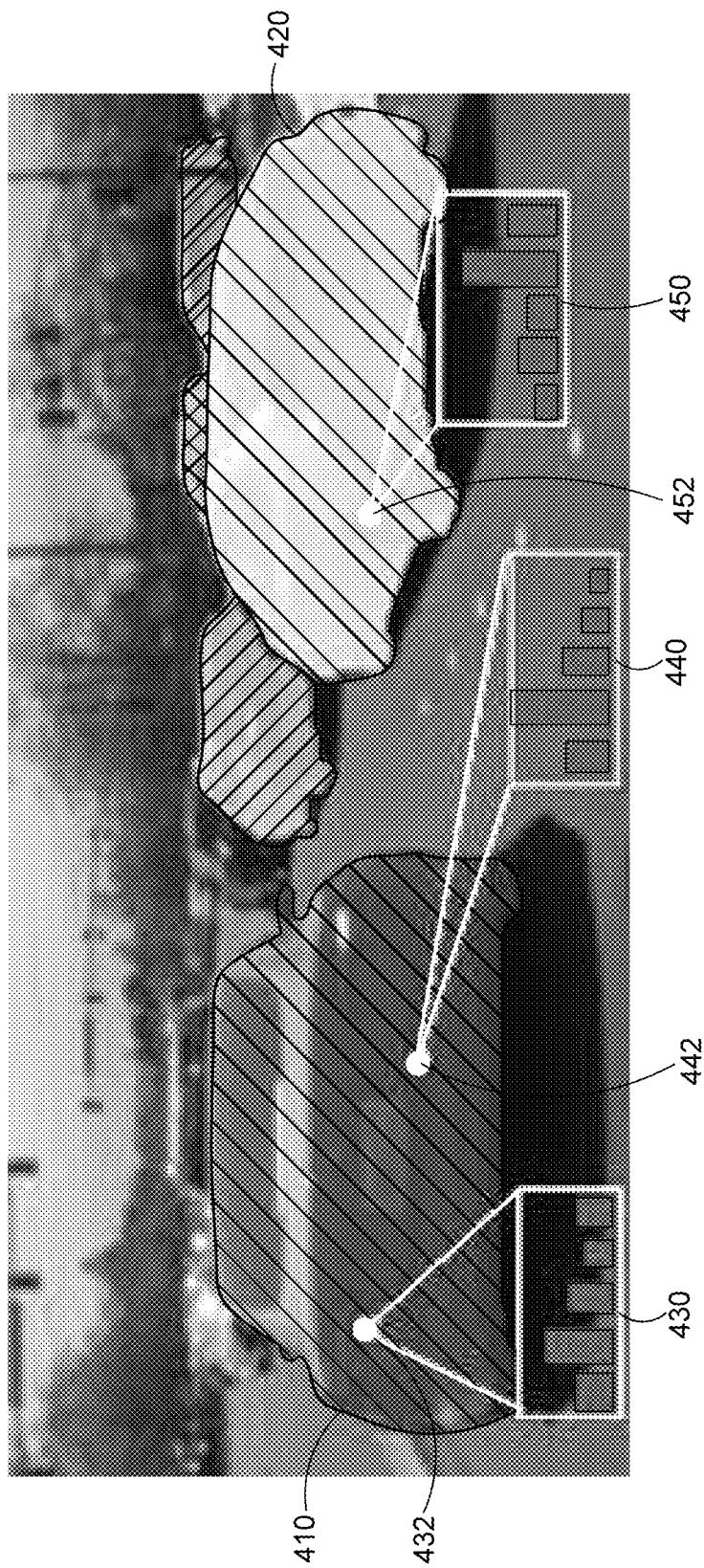
FIG. 4 is an illustration of example predicted probability distribution functions for different pixels, in accordance with some embodiments of the present disclosure.

In some cases, the instance clustering head 240 may be configured to distinguish among clusters of locally unique instances (e.g., one for each of N channels), so any given confidence map may identify pixels that belong to multiple instances (e.g., one from each of a plurality of different clusters of instances). FIG. 4 is an illustration of example predicted probability distribution functions for different pixels. In FIG. 4, car 410 and car 420 are illustrated with masks for illustration purposes, and pixels 432, 442, and 452 are illustrated with corresponding example probability distribution functions 430, 440, and 450. In this example, the probability distribution functions 430, 440, and 450 include five bars corresponding to five depth channels, where each bar represents a predicted probability that the corresponding pixel belongs to an instance represented by a corresponding channel. Note that the pixels 432 and 442 in the car 410 have respective probability distribution functions 430 and 440 with a similar shape (e.g., a maximum probability corresponding to the second channel). By contrast, the pixel 452 in the car 420 has a probability distribution function 450 with a different shape (a maximum probability corresponding to the fourth channel) than the pixels in the car 410 have. Predicted probability distribution functions such as these may be decoded to identify the unique instances, thereby performing instance segmentation.

More specifically, a connected-component analysis (e.g., connected-component labeling 340) may be performed (e.g., on each confidence map) to identify any number of connected regions having stable classification values (e.g., pixels with individual classification values above a threshold, pixels with a statistical measure of their individual classification values above or below a threshold, etc.). Any known connected-component analysis may be performed on any given confidence map to identify one or more connected regions (and corresponding boundaries) corresponding to unique instances represented by the confidence map. In embodiments where any particular confidence map may represent the locations of multiple instances (e.g., one from each of a plurality of clusters of neighboring and/or occluded instances), the connected-component analysis may involve initially assigning pixels with locally stable classification values to a single instance per channel. The initially identified instance may correspond to multiple disconnected regions. In some embodiments, select disconnected regions (e.g., regions that are separated by some minimum distance) may be split into distinct connected regions (e.g., globally unique connected regions).

In some embodiments, a connected-components analysis may be performed using multiple confidence maps to identify connected regions such that no pixel is assigned to more than one distinct connected region. For example, in some cases, one or more connected regions may be initially identified from each confidence map, and the identified regions may be compared to identify any overlapping portion(s) (e.g., any pixels assigned to more than one connected region). If any pixels are assigned to more than one connected region, each such pixel may be assigned to one of the regions using any suitable metric (e.g., by assigning to the region with the highest predicted classification value, assigning to the region with the closest predicted range, etc.). Generally, the connected-components analysis techniques described herein are meant simply as examples, and other variations may be implemented within the scope of the present disclosure.

As such, the connected-component analysis may be applied to decode the instance confidence data 112 to identify distinct connected regions and corresponding boundary shapes. Each region may be assigned a globally unique instance identification (ID). In this manner, the instance clustering head 240 (with post-processing 114) may be considered to directly regress, cluster, and/or label unique instances, thereby performing instance segmentation. A class label may be applied to each identified bounding shape (e.g., based on a classification of a corresponding pixel(s) represented by the class confidence data 110, based on supported class(es) of the instance clustering head 240, etc.). In some embodiments, a range value may be applied to each identified bounding shape, for example, using the depth data 113 (e.g., by identifying a value corresponding to a representative pixel such as the centroid of the object identified by the bounding shape, by identifying a representative value such as a closest range associated with the pixels of the object identified by the bounding shape, by determining some statistical measure of range values for pixels of the object, etc.). As such, bounding shapes, instance labels, class labels, and/or range values may be identified for detected objects.

Once the locations, geometry, orientations, class labels, instance labels, and/or range values for detected objects have been determined, 2D pixel coordinates defining the detected objects may be converted to 3D world coordinates for use with corresponding class labels by the autonomous vehicle in performing one or more operations (e.g., obstacle avoidance, lane keeping, lane changing, path planning, mapping, etc.). In some embodiments, a low-level perception stack that does not use a DNN may process sensor data to detect objects in parallel to the machine learning model(s) 108 (e.g., for redundancy). In any event, returning to FIG. 1, the object detections 116 (e.g., bounding boxes, closed polylines, or other bounding shapes) may be used by control component(s) of the autonomous vehicle 1000 depicted in FIGS. 10A-10D, such as an autonomous driving software stack 122 executing on one or more components of the vehicle 1000 (e.g., the SoC(s) 1004, the CPU(s) 1018, the GPU(s) 1020, etc.). For example, the vehicle 1000 may use this information (e.g., instances of obstacles) to navigate, plan, or otherwise perform one or more operations (e.g., obstacle avoidance, lane keeping, lane changing, merging, splitting, etc.) within the environment.

In some embodiments, the object detections 116 may be used by one or more layers of the autonomous driving software stack 122 (alternatively referred to herein as "drive stack 122"). The drive stack 122 may include a sensor manager (not shown), perception component(s) (e.g., corresponding to a perception layer of the drive stack 122), a world model manager 126, planning component(s) 128 (e.g., corresponding to a planning layer of the drive stack 122), control component(s) 130 (e.g., corresponding to a control layer of the drive stack 122), obstacle avoidance component(s) 132 (e.g., corresponding to an obstacle or collision avoidance layer of the drive stack 122), actuation component(s) 134 (e.g., corresponding to an actuation layer of the drive stack 122), and/or other components corresponding to additional and/or alternative layers of the drive stack 122. The process 100 may, in some examples, be executed by the perception component(s), which may feed up the layers of the drive stack 122 to the world model manager, as described in more detail herein.

The sensor manager may manage and/or abstract the sensor data 102 from the sensors of the vehicle 1000. For example, and with reference to FIG. 10C, the sensor data 102 may be generated (e.g., perpetually, at intervals, based on certain conditions) by RADAR sensor(s) 1060. The sensor manager may receive the sensor data 102 from the sensors in different formats (e.g., sensors of the same type may output sensor data in different formats), and may be configured to convert the different formats to a uniform format (e.g., for each sensor of the same type). As a result, other components, features, and/or functionality of the autonomous vehicle 1000 may use the uniform format, thereby simplifying processing of the sensor data 102. In some examples, the sensor manager may use a uniform format to apply control back to the sensors of the vehicle 1000, such as to set frame rates or to perform gain control. The sensor manager may also update sensor packets or communications corresponding to the sensor data with timestamps to help inform processing of the sensor data by various components, features, and functionality of an autonomous vehicle control system.

A world model manager 126 may be used to generate, update, and/or define a world model. The world model manager 126 may use information generated by and received from the perception component(s) of the drive stack 122 (e.g., the locations of detected obstacles). The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager 126 may continually update the world model based on newly generated and/or received inputs (e.g., data) from the obstacle perceiver, the path perceiver, the wait perceiver, the map perceiver, and/or other components of the autonomous vehicle control system.

The world model may be used to help inform planning component(s) 128, control component(s) 130, obstacle avoidance component(s) 132, and/or actuation component(s) 134 of the drive stack 122. The obstacle perceiver may perform obstacle perception that may be based on where the vehicle 1000 is allowed to drive or is capable of driving (e.g., based on the location of the drivable or other navigable paths defined by avoiding detected obstacles), and how fast the vehicle 1000 can drive without colliding with an obstacle (e.g., an object, such as a structure, entity, vehicle, etc.) that is sensed by the sensors of the vehicle 1000 and/or the machine learning model(s) 108.

The path perceiver may perform path perception, such as by perceiving nominal paths that are available in a particular situation. In some examples, the path perceiver may further take into account lane changes for path perception. A lane graph may represent the path or paths available to the vehicle 1000, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information.

The wait perceiver may be responsible to determining constraints on the vehicle 1000 as a result of rules, conventions, and/or practical considerations. For example, the rules, conventions, and/or practical considerations may be in relation to traffic lights, multi-way stops, yields, merges, toll booths, gates, police or other emergency personnel, road workers, stopped buses or other vehicles, one-way bridge arbitrations, ferry entrances, etc. Thus, the wait perceiver may be leveraged to identify potential obstacles and implement one or more controls (e.g., slowing down, coming to a stop, etc.) that may not have been possible relying solely on the obstacle perceiver.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the vehicle 1000 of static or stationary infrastructure objects and obstacles. The map perceiver may also generate information for the wait perceiver and/or the path perceiver, for example, such as to determine which light at an intersection has to be green for the vehicle 1000 to take a particular path.

Figure 10A:
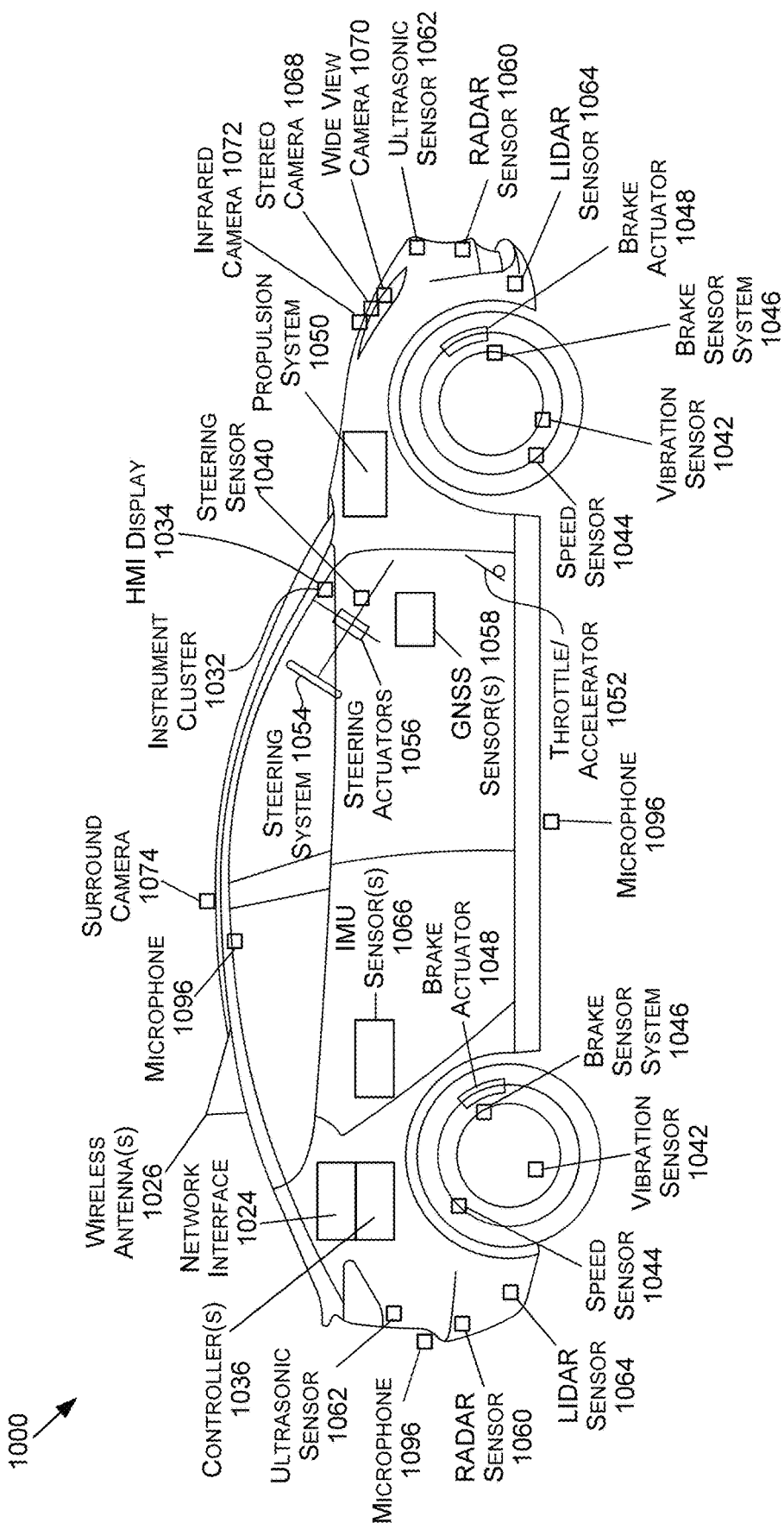
FIG. 10A is an illustration of an example autonomous vehicle, in accordance with some embodiments of the present disclosure.
Figure 10B:
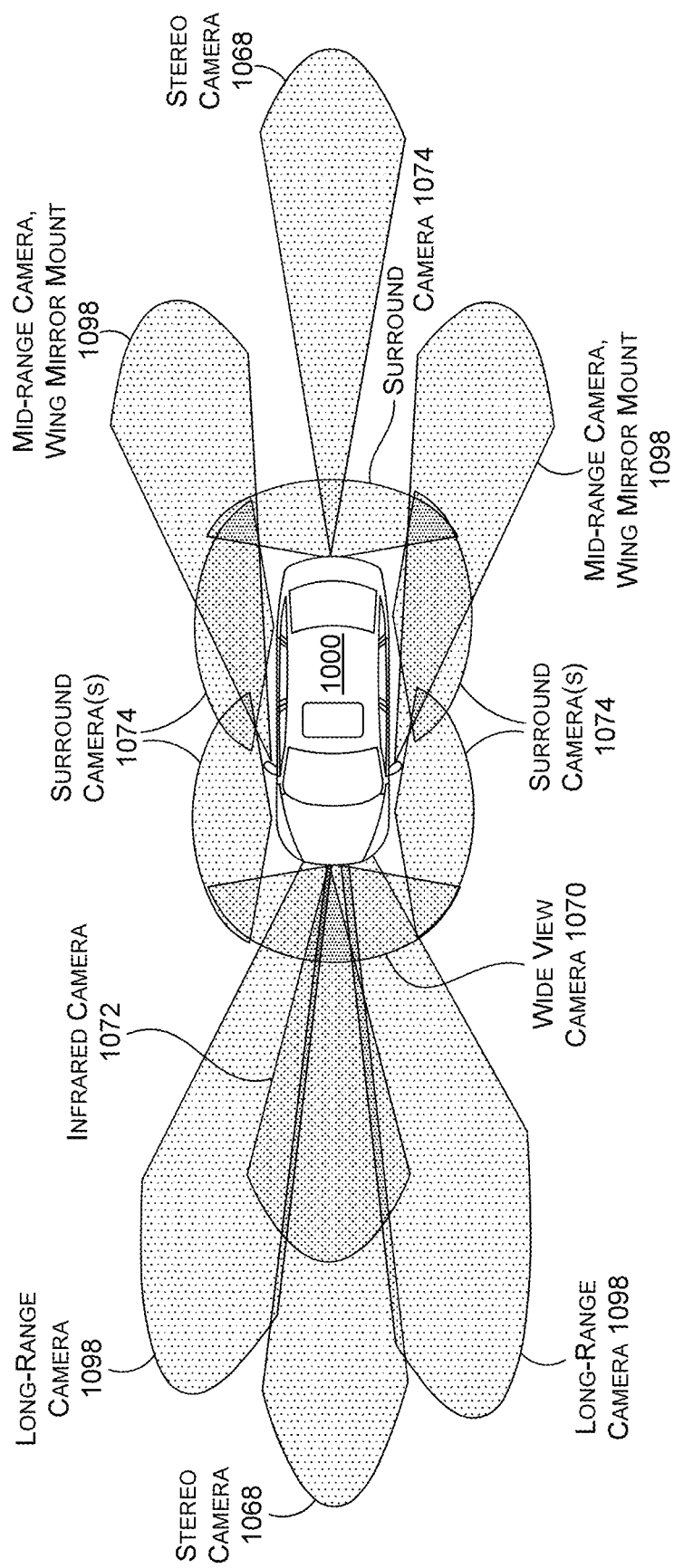
FIG. 10B is an example of camera locations and fields of view for the example autonomous vehicle of FIG. 10A, in accordance with some embodiments of the present disclosure.
Figure 10C:
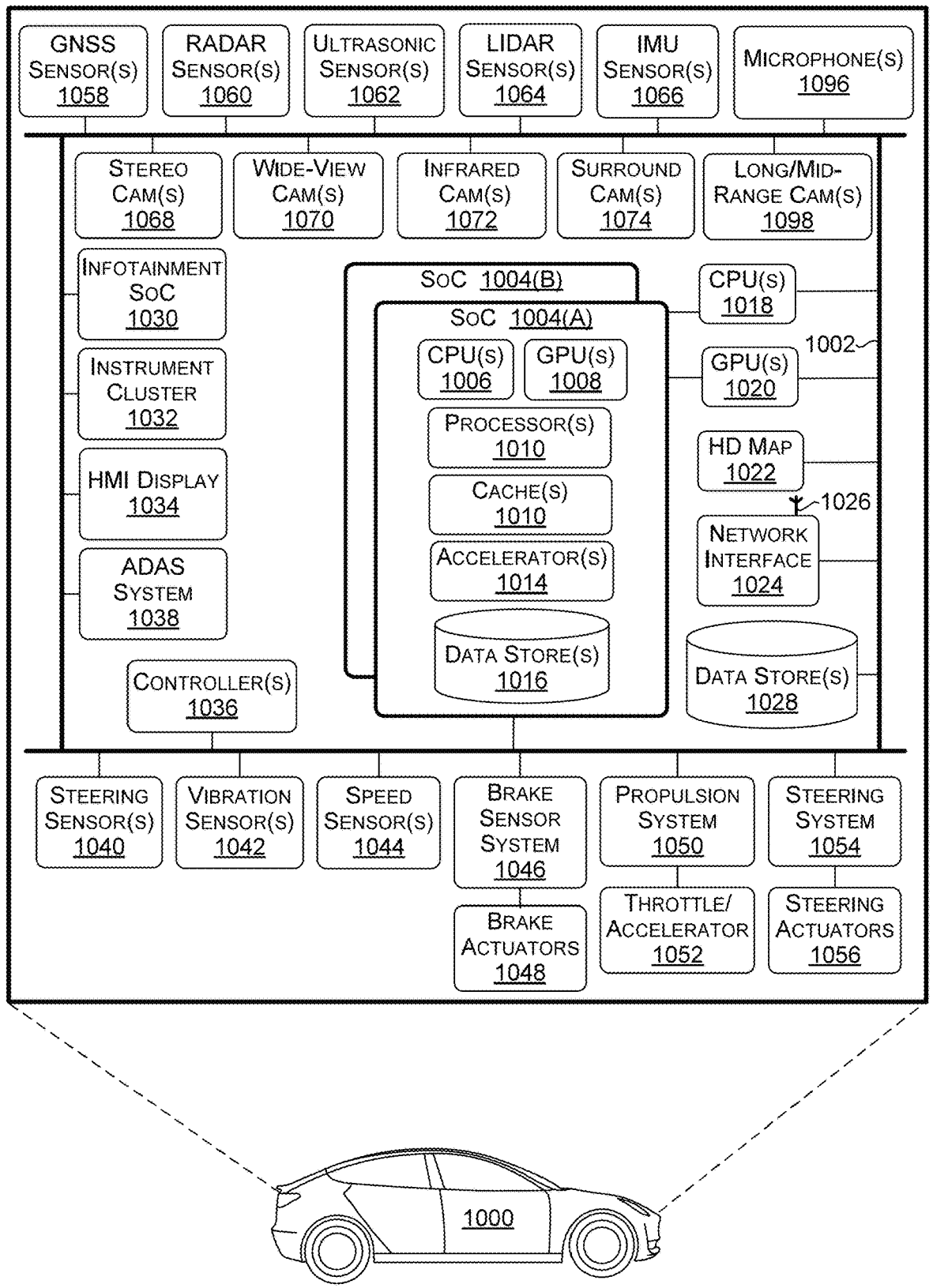
FIG. 10C is a block diagram of an example system architecture for the example autonomous vehicle of FIG. 10A, in accordance with some embodiments of the present disclosure.
Figure 10D:
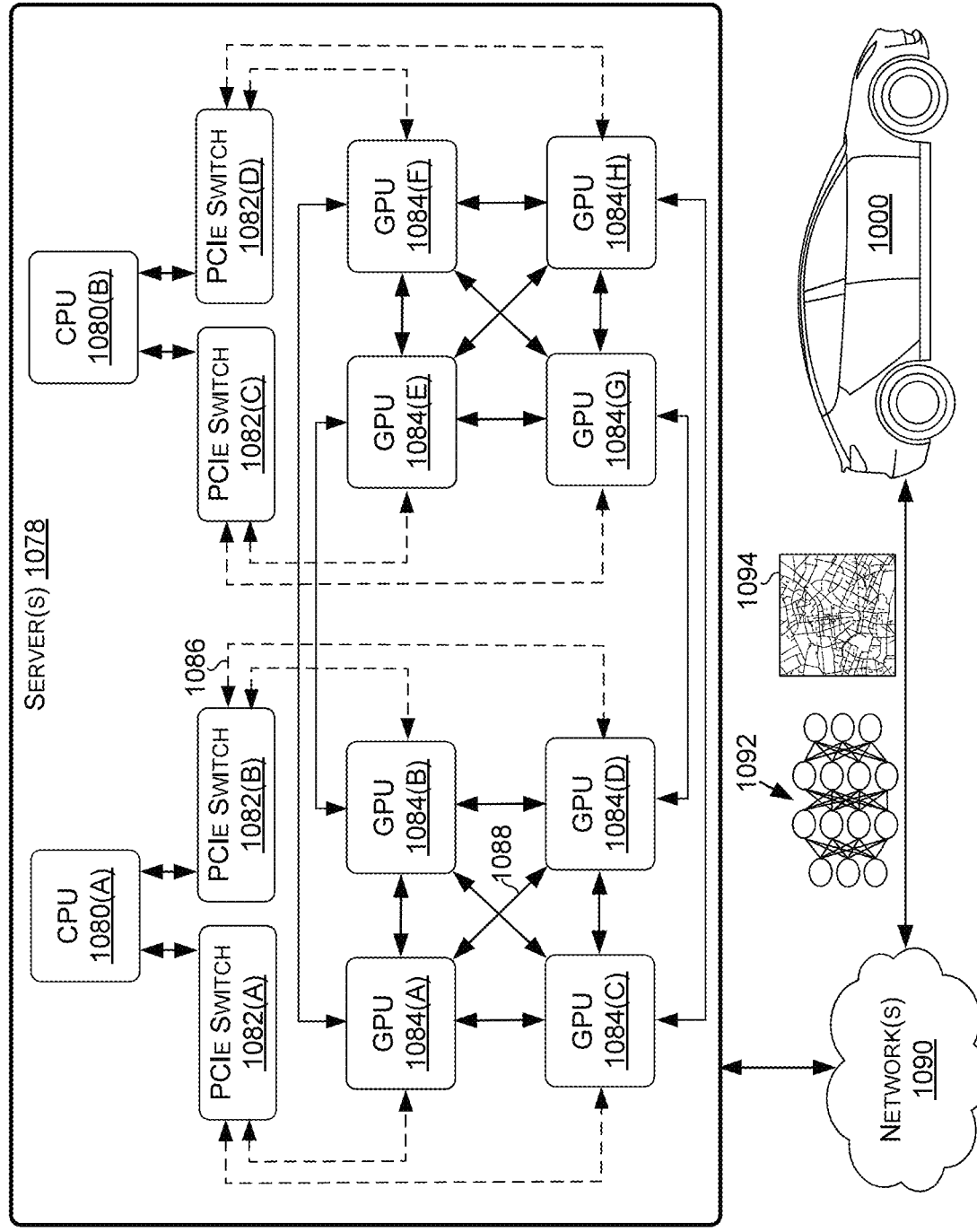
FIG. 10D is a system diagram for communication between cloud-based server(s) and the example autonomous vehicle of FIG. 10A, in accordance with some embodiments of the present disclosure.

In some examples, information from the map perceiver may be sent, transmitted, and/or provided to server(s) (e.g., to a map manager of server(s) 1078 of FIG. 10D), and information from the server(s) may be sent, transmitted, and/or provided to the map perceiver and/or a localization manager of the vehicle 1000. The map manager may include a cloud mapping application that is remotely located from the vehicle 1000 and accessible by the vehicle 1000 over one or more network(s). For example, the map perceiver and/or the localization manager of the vehicle 1000 may communicate with the map manager and/or one or more other components or features of the server(s) to inform the map perceiver and/or the localization manager of past and present drives or trips of the vehicle 1000, as well as past and present drives or trips of other vehicles. The map manager may provide mapping outputs (e.g., map data) that may be localized by the localization manager based on a particular location of the vehicle 1000, and the localized mapping outputs may be used by the world model manager 126 to generate and/or update the world model.

The planning component(s) 128 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints), 3D world coordinates (e.g., Cartesian, polar, etc.) that indicate coordinates relative to an origin point on the vehicle 1000, etc. The waypoints may be representative of a specific distance into the future for the vehicle 1000, such as a number of city blocks, a number of kilometers, a number of feet, a number of inches, a number of miles, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 1000, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 130 may follow a trajectory or path (lateral and longitudinal) that has been received from the behavior selector (e.g., based on object detections 116) of the planning component(s) 128 as closely as possible and within the capabilities of the vehicle 1000. The control component(s) 130 may use tight feedback to handle unplanned events or behaviors that are not modeled and/or anything that causes discrepancies from the ideal (e.g., unexpected delay). In some examples, the control component(s) 130 may use a forward prediction model that takes control as an input variable, and produces predictions that may be compared with the desired state (e.g., compared with the desired lateral and longitudinal path requested by the planning component(s) 128). The control(s) that minimize discrepancy may be determined.

Although the planning component(s) 128 and the control component(s) 130 are illustrated separately, this is not intended to be limiting. For example, in some embodiments, the delineation between the planning component(s) 128 and the control component(s) 130 may not be precisely defined. As such, at least some of the components, features, and/or functionality attributed to the planning component(s) 128 may be associated with the control component(s) 130, and vice versa. This may also hold true for any of the separately illustrated components of the drive stack 122.

The obstacle avoidance component(s) 132 may aid the autonomous vehicle 1000 in avoiding collisions with objects (e.g., moving and stationary objects). The obstacle avoidance component(s) 132 may include a computational mechanism at a "primal level" of obstacle avoidance, and may act as a "survival brain" or "reptile brain" for the vehicle 1000. In some examples, the obstacle avoidance component(s) 132 may be used independently of components, features, and/or functionality of the vehicle 1000 that is required to obey traffic rules and drive courteously. In such examples, the obstacle avoidance component(s) may ignore traffic laws, rules of the road, and courteous driving norms in order to ensure that collisions do not occur between the vehicle 1000 and any objects. As such, the obstacle avoidance layer may be a separate layer from the rules of the road layer, and the obstacle avoidance layer may ensure that the vehicle 1000 is only performing safe actions from an obstacle avoidance standpoint. The rules of the road layer, on the other hand, may ensure that vehicle obeys traffic laws and conventions, and observes lawful and conventional right of way (as described herein).

In some examples, the drivable or other navigable paths and/or object detections 116 may be used by the obstacle avoidance component(s) 132 in determining controls or actions to take. For example, the drivable paths may provide an indication to the obstacle avoidance component(s) 132 of where the vehicle 1000 may maneuver without striking any objects, structures, and/or the like, or at least where no static structures may exist.

In non-limiting embodiments, the obstacle avoidance component(s) 132 may be implemented as a separate, discrete feature of the vehicle 1000. For example, the obstacle avoidance component(s) 132 may operate separately (e.g., in parallel with, prior to, and/or after) the planning layer, the control layer, the actuation layer, and/or other layers of the drive stack 122.

As such, the vehicle 1000 may use this information (e.g., as the edges, or rails of the paths) to navigate, plan, or otherwise perform one or more operations (e.g. lane keeping, lane changing, merging, splitting, etc.) within the environment.

Figure 5B:
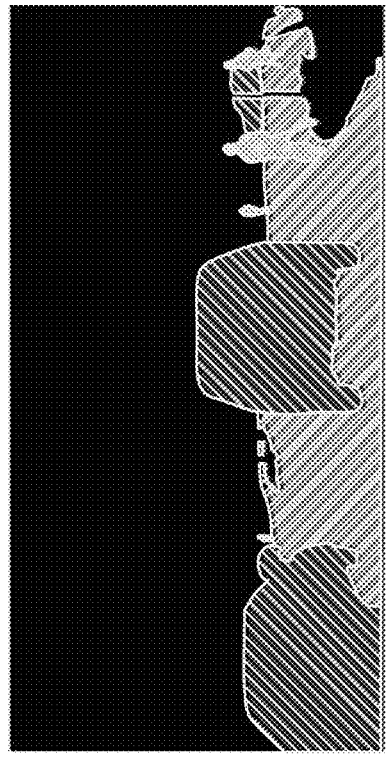
FIG. 5B is an illustration of an example predicted segmentation mask.
Figure 5D:
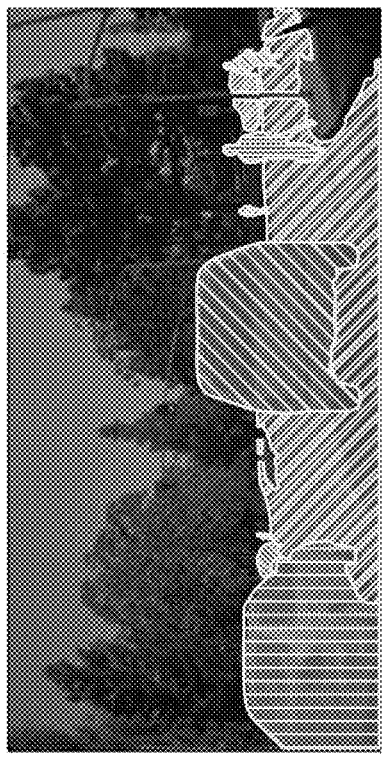
FIG. 5D is an illustration of an example instance segmentation, in accordance with some embodiments of the present disclosure.
Figure 5A:
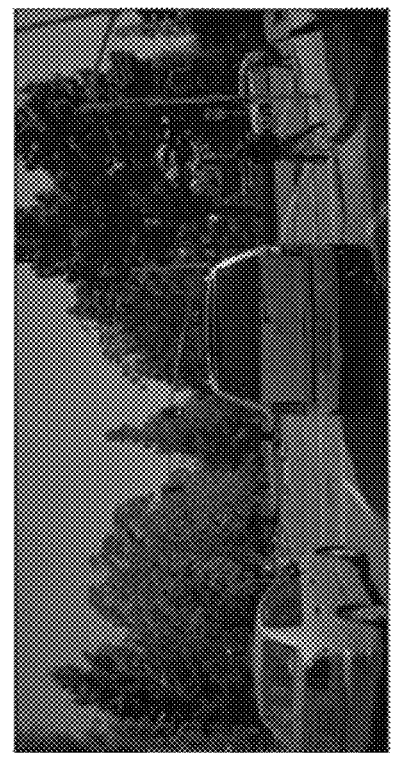
FIG. 5A is an illustration of an example input scene.
Figure 5C:
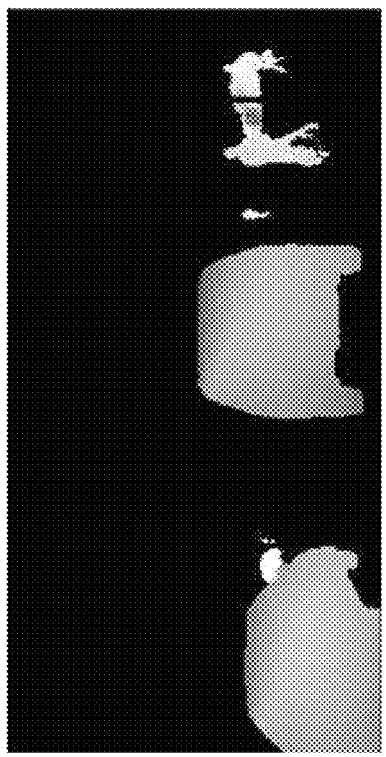
FIG. 5C is an illustration of example predicted instance vectors.

Turning now to FIGS. 5A-5D, these figures illustrate an example of panoptic segmentation, in accordance with some embodiments of the present disclosure. More specifically, FIG. 5A is an illustration of an example input scene that may be encoded and/or used as an input into a machine learning model(s). FIG. 5B is an illustration of an example predicted segmentation mask (e.g., which may correspond to at least a portion of the class confidence data 110 predicted by the class confidence head 220 of FIG. 2). In FIG. 5B, the example segmentation mask is illustrated using different shading patterns to identify the predicted regions corresponding to different classes. FIG. 5C is an illustration of example predicted instance vectors (e.g., which may correspond to at least a portion of the instance regression data 111 predicted by the instance regression head 230 of FIG. 2). For example, in embodiments in which the instance regression data 111 includes one or more channels that regress pixel-wise values representing dx and/or dy components of an instance vector pointing to a portion (e.g., the top, left corner) of the instance to which the pixel belongs, vector colorization may be applied to visualize the predicted instance vector for each pixel. Any suitable technique may be applied to map the instance vectors to a color space (e.g., red-green-blue (RGB), HSL (hue, saturation, lightness) HSB (hue, saturation, brightness), HSV (hue, saturation, value), etc.). FIG. 5C illustrates an example visualization of predicted instance vectors (converted to greyscale). The instance regression data 111 (such as predicted instance vectors) may be decoded to identify and segment unique instances in the scene (e.g., via post-processing 114). FIG. 5D is an illustration of an example instance segmentation. Note that, in this example, the vehicles identified in the segmentation mask of FIG. 5B are in the same predicted class, whereas in the instance segmentation illustrated in FIG. 5D, the vehicles have been segmented into separate instances (illustrated by different shading patterns).

Figure 6B:
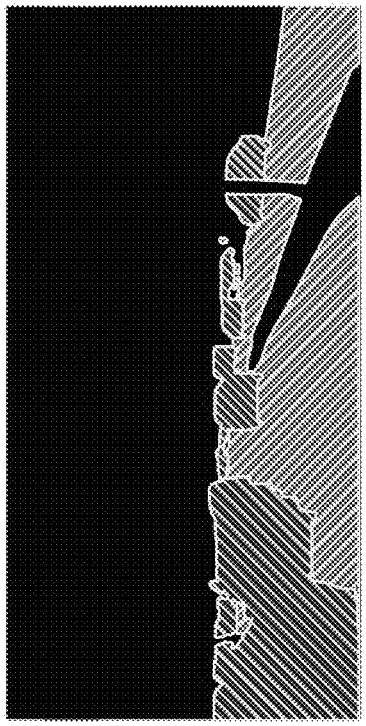
FIG. 6B is an illustration of an example predicted segmentation mask.
Figure 6D:
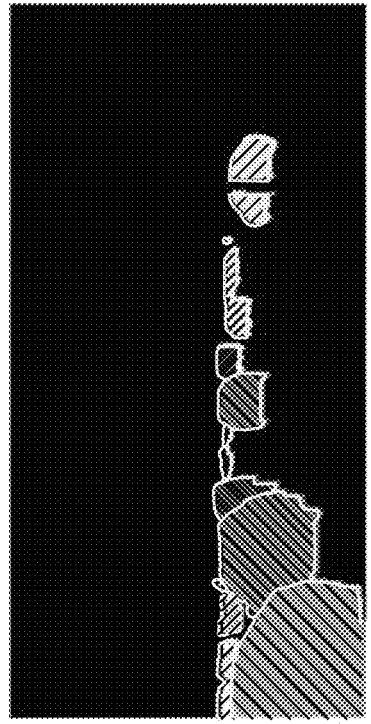
FIG. 6D is an illustration of example detected instances of animate objects.
Figure 6A:
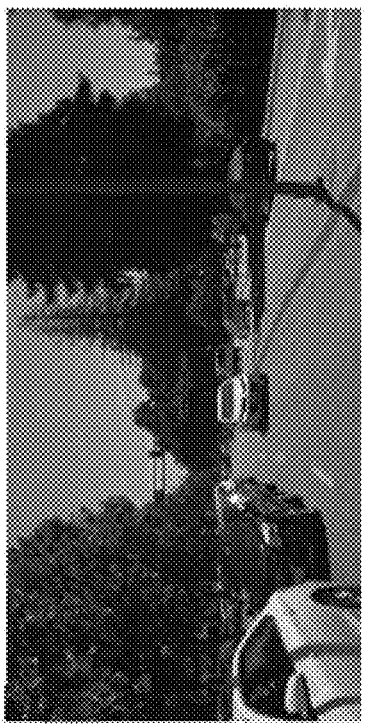
FIG. 6A is an illustration of an example input scene.
Figure 6C:
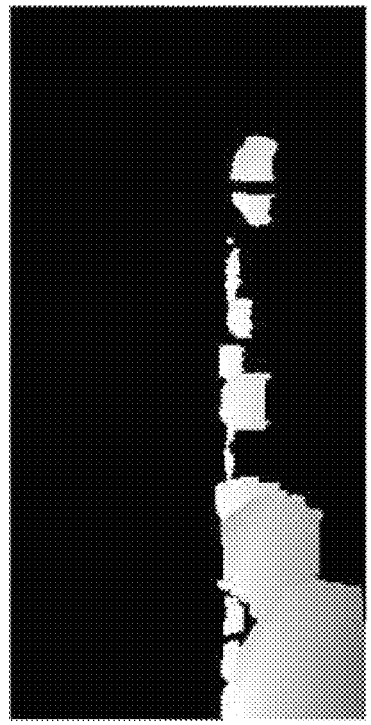
FIG. 6C is an illustration of example predicted instance vectors.
Figure 6E:
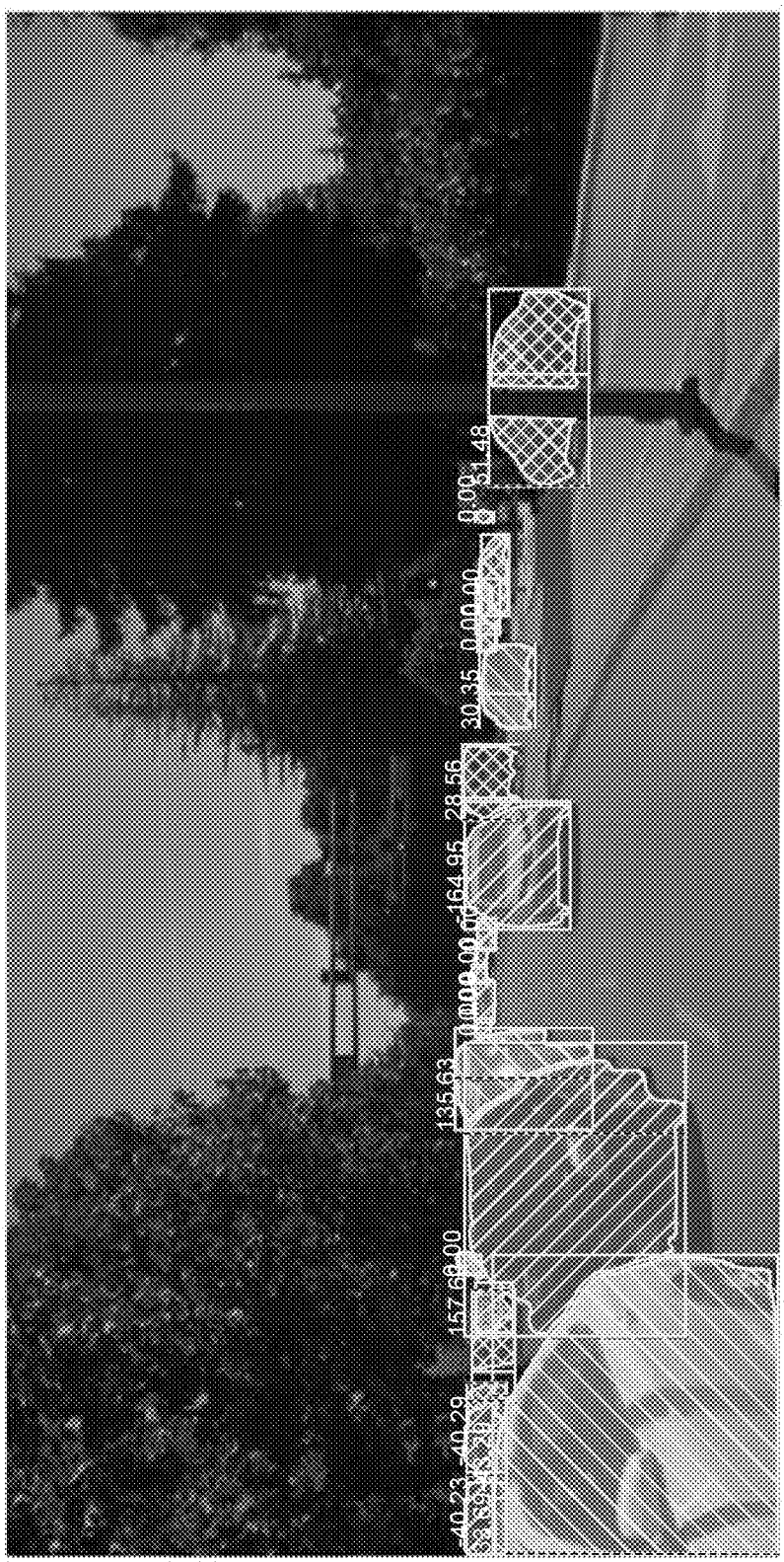
FIG. 6E is an illustration of an example instance segmentation with range data, in accordance with some embodiments of the present disclosure.

Turning now to FIGS. 6A-6E, these figures illustrate another example of panoptic segmentation, in accordance with some embodiments of the present disclosure. More specifically, FIG. 6A is an illustration of an example input scene, and FIG. 6B is an illustration of an example predicted segmentation mask that segments the example input scene into a drivable road surface and animate objects. FIG. 6C is an illustration of example predicted instance vectors, FIG. 6D is an illustration of corresponding example detected instances of the animate objects, and FIG. 6E is an illustration of an example instance segmentation of the example input scene with range data. Since a single pass of the same machine learning model may be used to perform class segmentation (e.g., to generate the segmentation mask illustrated in FIG. 6B) and instance segmentation (e.g., to identify the instances illustrated in FIGS. 6D and 6E), the machine learning model may be considered to perform panoptic segmentation.

Figure 7:
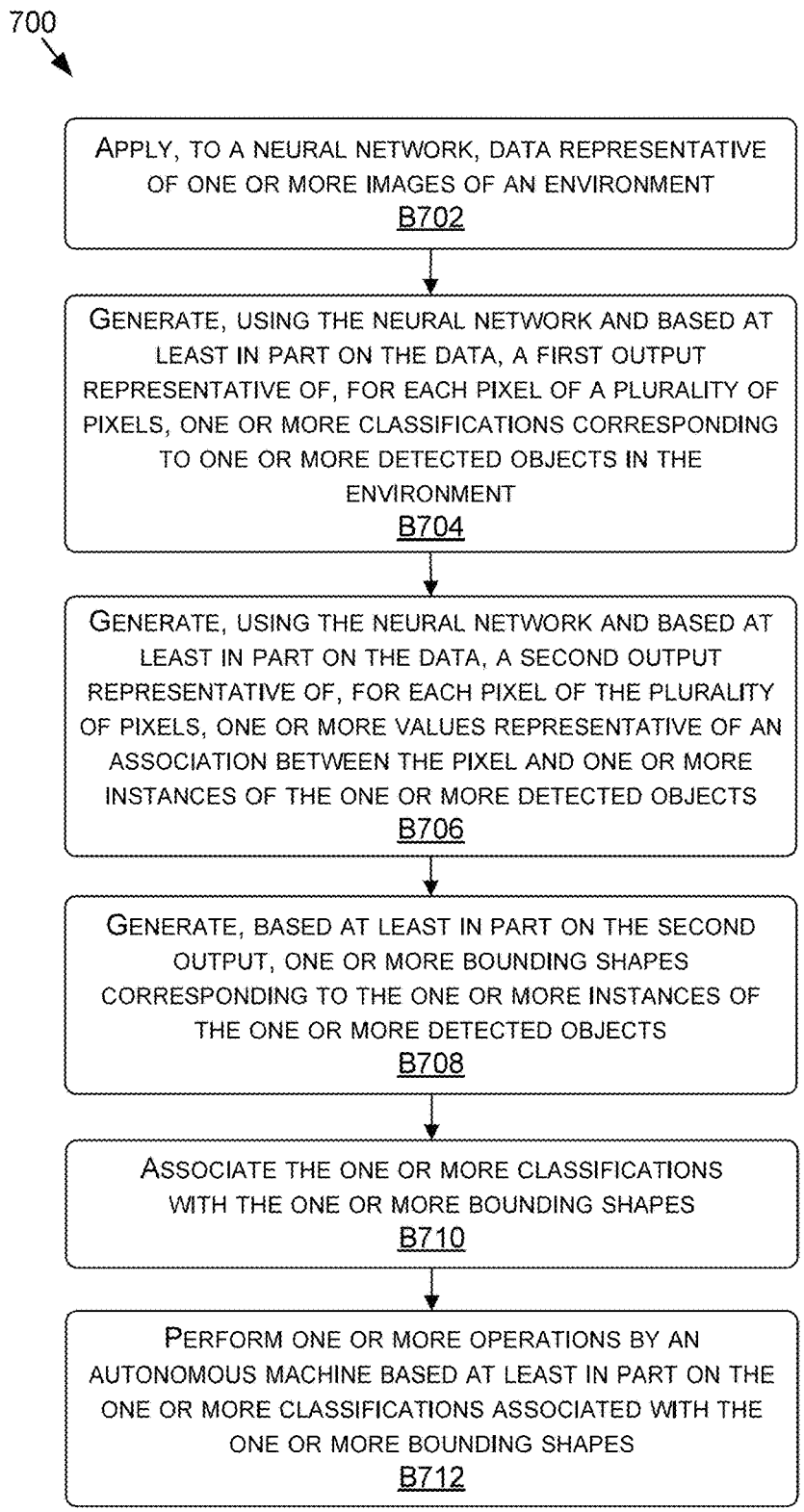
FIG. 7 is a flow diagram showing a method for performing one or more operations by an autonomous machine based at least in part on one or more classifications, in accordance with some embodiments of the present disclosure.
Figure 8:
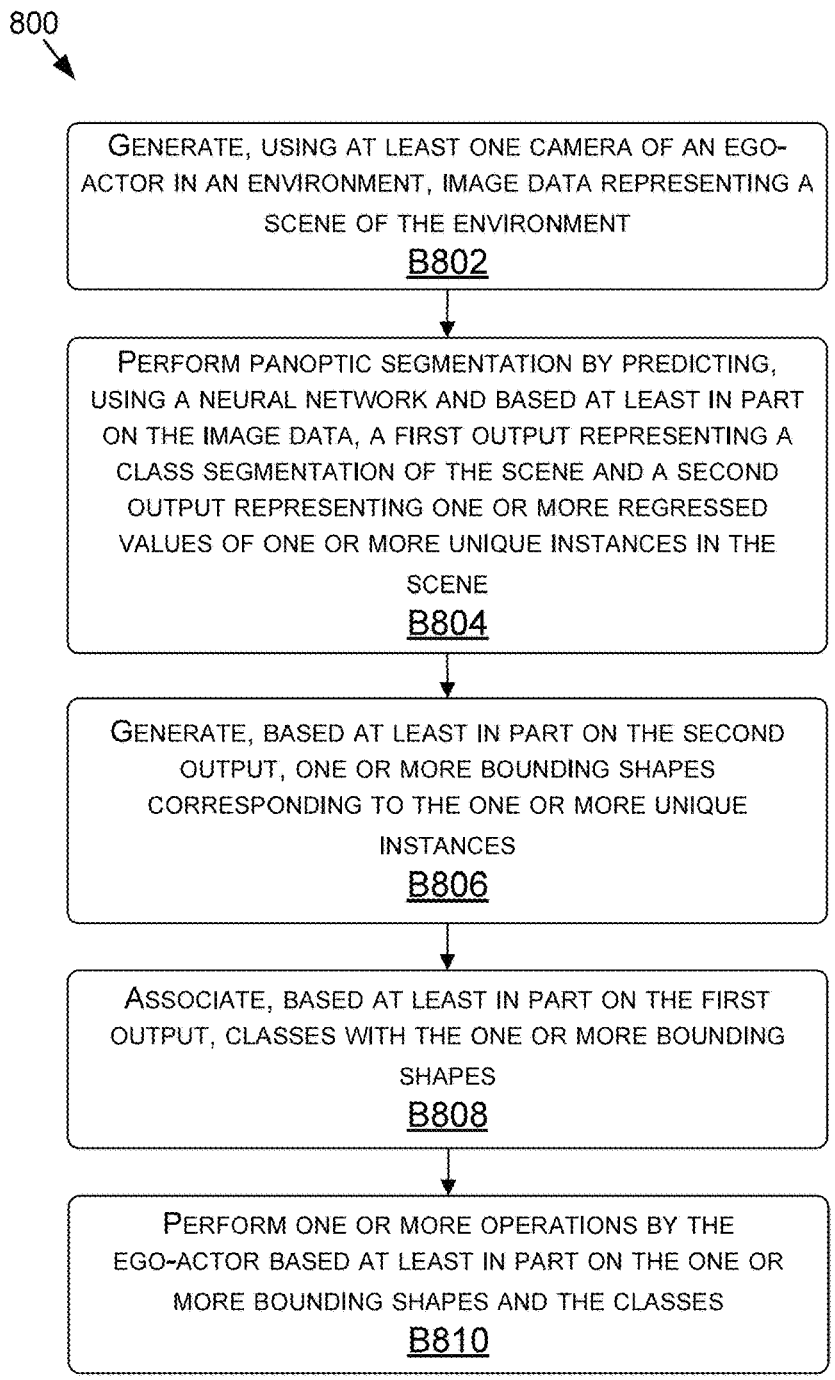
FIG. 8 is a flow diagram showing a method for performing panoptic segmentation, in accordance with some embodiments of the present disclosure.
Figure 9:
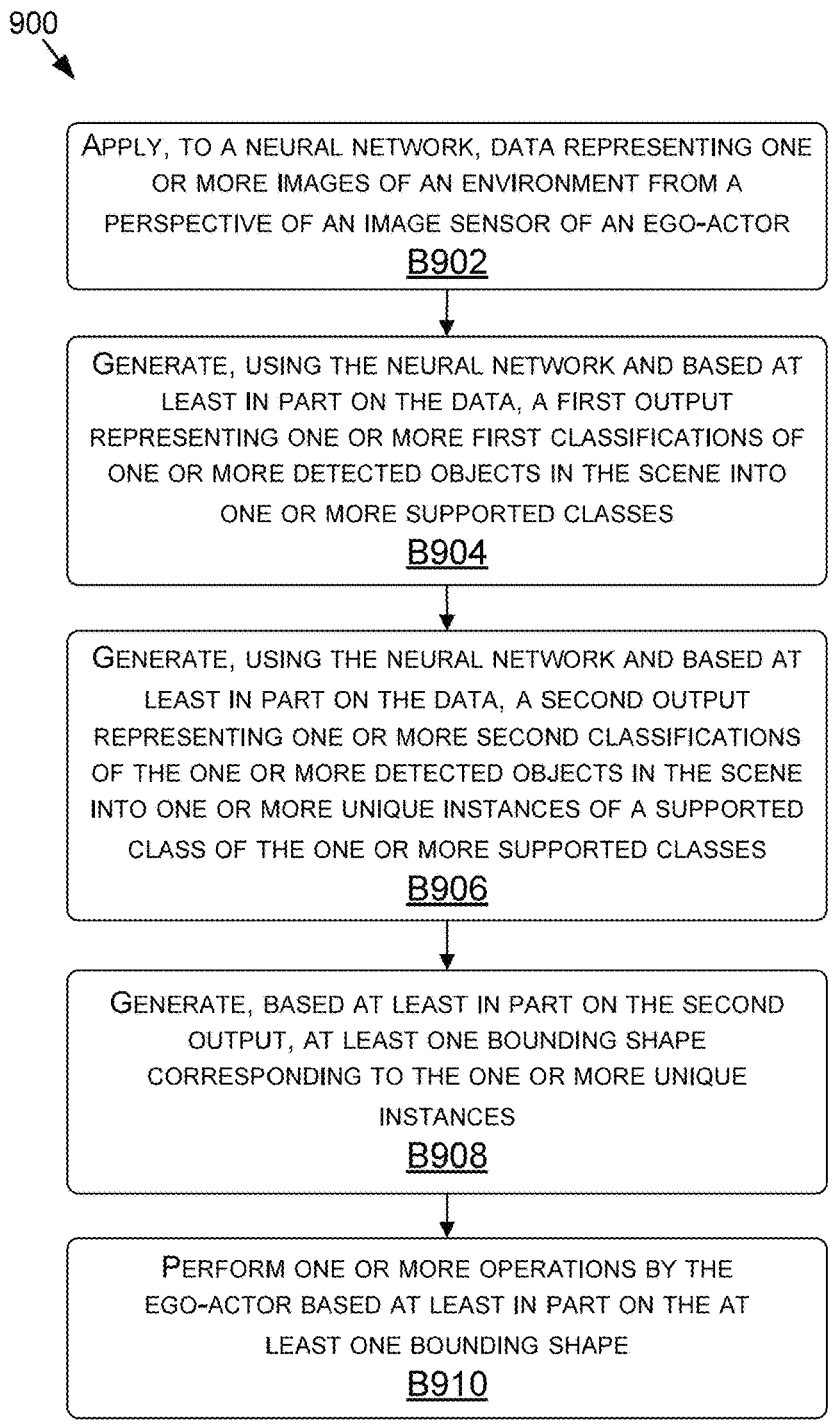
FIG. 9 is a flow diagram showing a method for performing one or more operations by an ego-actor based at least in part on at least one bounding shape, in accordance with some embodiments of the present disclosure.

Now referring to FIGS. 7-9, each block of methods 700, 800, and 900, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 700, 800, and 900 are described, by way of example, with respect to the object detection system described herein. However, these methods may additionally or alternatively be executed by any one system, or any combination of systems, including, but not limited to, those described herein.

FIG. 7 is a flow diagram showing a method 700 for performing one or more operations by an autonomous machine based at least in part on one or more classifications, in accordance with some embodiments of the present disclosure. The method 700, at block B702, includes applying, to a neural network, data representative of one or more images of an environment. For example, the input data 106 (e.g., one or more images and/or other data, which may be stacked into corresponding channels of an input tensor) may be fed into the machine learning model(s) 108 of FIG. 1.

The method 700, at block B704, includes generating, using the neural network and based at least in part on the data, a first output representative of, for each pixel of a plurality of pixels, one or more classifications corresponding to one or more detected objects in the environment. For example, the class confidence head 220 of the machine learning model(s) 108 of FIG. 2 may generate the class confidence data 110, which may include one or more confidence maps representative of pixels belonging to supported object class(es) of detected objects.

The method 700, at block B706, includes generating, using the neural network and based at least in part on the data, a second output representative of, for each pixel of the plurality of pixels, one or more values representative of an association between the pixel and one or more instances of the one or more detected objects. For example, the instance regression head 230 of the machine learning model(s) 108 of FIG. 2 may generate the instance regression data 111, which may regress, for each pixel, one or more values (e.g., for each of plurality of channels) of a particular object instance to which the pixel belongs. Additionally or alternatively, the instance clustering head 240 of the machine learning model(s) 108 of FIG. 2 may generate the instance confidence data 112, which may include one or more confidence maps representative of pixels belonging to a particular instance. Generally, the neural network may generate the first output and the second output in a single pass.

The method 700, at block B708, includes generating, based at least in part on the second output, one or more bounding shapes corresponding to the one or more instances of the one or more detected objects. For example, the instance regression data 111 and/or the instance confidence data 112 of FIG. 1 may be subject to post-processing 114 to identify the one or more bounding shapes.

The method 700, at block B710, includes associating the one or more classifications with the one or more bounding shapes. For example, a class label may be applied to each identified bounding shape based on a known mapping between channels of the second output and class labels, based on associated classification data from the first output, and/or other ways.

The method 700, at block B712, includes performing one or more operations by an autonomous machine based at least in part on the one or more classifications associated with the one or more bounding shapes.

FIG. 8 is a flow diagram showing a method 800 for performing panoptic segmentation, in accordance with some embodiments of the present disclosure. The method 800, at block B802, includes generating, using at least one camera of an ego-actor in an environment, image data representing a scene of the environment. For example, the sensor(s) 101 of FIG. 1 may include one or more cameras and/or other sensors of an ego-actor, such as an autonomous or semi-autonomous vehicle, and the one or more cameras and/or other sensors may be used to generate image data (e.g., the sensor data 102).

The method 800, at block B804, includes performing panoptic segmentation by predicting, using a neural network and based at least in part on the image data, a first output representing a class segmentation of the scene and a second output representing one or more regressed values of one or more unique instances in the scene. For example, the machine learning model(s) 108 of FIG. 1 may perform panoptic segmentation by performing pixel-level class and instance segmentation of a scene in a single pass to generate one or more confidence maps (e.g., class confidence data 110) and object instance data (e.g., location, geometry, pose, orientation, etc.) for detected objects (e.g., instance regression data 111).

The method 800, at block B806, includes generating, based at least in part on the second output, one or more bounding shapes corresponding to the one or more unique instances. For example, the instance regression data 111 may be subject to post-processing 114 to identify the one or more bounding shapes.

The method 800, at block B808, includes associating, based at least in part on the first output, classes with the one or more bounding shapes. For example, a class label may be applied to each identified bounding shape based on a known mapping between channels of the second output and class labels, based on associated classification data from the first output, and/or other ways.

The method 800, at block B810, includes performing one or more operations by the ego-actor based at least in part on the one or more bounding shapes and the classes.

FIG. 9 is a flow diagram showing a method 900 for performing one or more operations by an ego-actor based at least in part on at least one bounding shape, in accordance with some embodiments of the present disclosure. The method 900, at block B902, includes applying, to a neural network, data representing one or more images of an environment from a perspective of an image sensor of an ego-actor. For example, the sensor(s) 101 of FIG. 1 may include one or more cameras and/or other sensors of an ego-actor, such as an autonomous or semi-autonomous vehicle, and the one or more cameras and/or other sensors may be used to generate one or more images (e.g., the sensor data 102). The sensor data 102 may be pre-processed (e.g., via pre-processing 104) to generate the input data 106, which may be fed into the machine learning model(s) 108 of FIG. 1.

The method 900, at block B904, includes generating, using the neural network and based at least in part on the data, a first output representing one or more first classifications of one or more detected objects in the scene into one or more supported classes. For example, the class confidence head 220 of the machine learning model(s) 108 of FIG. 2 may generate the class confidence data 110, which may include one or more confidence maps representative of pixels belonging to supported object class(es) of detected objects.

The method 900, at block B906, includes generating, using the neural network and based at least in part on the data, a second output representing one or more second classifications of the one or more detected objects in the scene into one or more unique instances of a supported class of the one or more supported classes. For example, the instance clustering head 240 of the machine learning model(s) 108 of FIG. 2 may generate the instance confidence data 112, which may include one or more confidence maps representative of pixels belonging to a particular instance. Generally, the neural network may generate the first output and the second output in a single pass.

The method 900, at block B908, includes generating, based at least in part on the second output, at least one bounding shape corresponding to the one or more unique instances. For example, the instance confidence data 112 of FIG. 1 may be subject to post-processing 114 to identify the one or more bounding shapes.

The method 900, at block B910, includes performing one or more operations by the ego-actor based at least in part on the at least one bounding shape.

Training Machine Learning Model(s) of an Object Detection System

In order to train a machine learning model for an object detection system (e.g., machine learning model(s) 108 of FIG. 1), input training data may be generated from sensor data using the techniques for operating the machine learning model(s) 108 described herein. Ground truth training data may be obtained by annotating data from a corresponding sensor(s) (e.g., one or more cameras and/or other sensors in a sensor setup).

Generally, sensor data (e.g., an image) may be annotated (e.g., manually, automatically, etc.) with labels or other markers identifying the locations, geometry, orientations, and/or classes of the instances of the relevant objects in the sensor data. The labels may be generated within a drawing program (e.g., an annotation program), computer aided design (CAD) program, labeling program, another type of suitable program, and/or may be hand drawn, in some examples. In any example, the labels may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). Generally, the labels may comprise bounding boxes, closed polylines, or other bounding shapes drawn, annotated, superimposed, and/or otherwise associated with the sensor data.

Input training data may be generated from sensor data in the manner described herein (e.g., via pre-processing 104), and the annotations (e.g., boundaries, enclosed regions, class labels) and/or other sensor data may be used to generate ground truth data for the machine learning model(s) 108 (e.g., class confidence data 110, instance regression data 111, instance confidence data 112, and/or depth data 113). For example, to generate ground truth data from annotations, the location, geometry, orientation, and/or class of each of the annotations may be used to generate a confidence map and/or segmentation mask matching the view, size, and dimensionality of the outputs of the machine learning model(s) 108 (e.g., class confidence data 110). By way of non-limiting example, for a given class and a corresponding dimension of a tensor storing a different confidence map in each channel, pixel values for pixels falling within each labeled bounding shape for that class may be set to a value indicating a positive classification (e.g., 1). The process may be repeated to generate values for corresponding channels of a ground truth class confidence tensor.

Additionally or alternatively, the location, geometry, orientation, and/or class of each of the annotations may be used to generate object instance data matching the view, size, and dimensionality of the instance regression data 111. For example, for each pixel contained within an annotation, the annotation may be used to compute corresponding location, geometry, and/or orientation information (e.g., where the object is located-such as the a corner or the center of the object-relative to each pixel, object height, object width, object orientation (e.g., rotation angles relative to the orientation of the projection image), and/or the like). The computed object instance data may be stored in a corresponding channel of a ground truth instance regression tensor.

In some embodiments, the location, geometry, orientation, and/or class of each of the annotations may be used to generate instance confidence data matching the view, size, and dimensionality of the instance confidence data 112. For example, each instance identified by the annotations may be assigned to a corresponding channel of an input tensor. In some cases, overlapping and/or neighboring instances may be clustered, and unique instances from each cluster may be assigned to different channels. For each pixel contained within an annotation of a particular instance, pixel values may be set to a value indicating a positive classification (e.g., 1) for one channel and a negative classification (e.g., 0) for the others. The process may be repeated to generate values for corresponding channels of a ground truth instance clustering tensor.

In embodiments that predict range data, ground truth range data may be derived in the manner described herein (e.g., via pre-processing 104). For example, RADAR and/or LiDAR data may be captured using the same sensor setup as the one or more cameras used for annotation. A RADAR and/or LiDAR point cloud may be projected to form a range image with the same view, size, and dimensionality of the depth data 113.

Thus, sensor data and/or annotations may be used to generate ground truth class confidence data, instance regression data, instance confidence data, and/or depth data, which may be used with corresponding input training data (e.g., input images, input tensors) as part of a training dataset to train the machine learning model(s) 108. Generally any suitable loss function may be used to update the machine learning model(s) 108 during training. For example, one or more loss functions (e.g., a single loss function, a loss function for each output type, etc.) may be used to compare the accuracy of the output(s) of the machine learning model(s) 108 to ground truth, and the parameters of the machine learning model(s) 108 may be updated (e.g., using backward passes, backpropagation, forward passes, etc.) until the accuracy reaches an optimal or acceptable level. In some embodiments in which machine learning model(s) 108 includes multiple heads, the multiple heads may be co-trained together on the same dataset, with a common trunk (e.g., that includes an encoder and at least portion of a decoder). In this manner, the different heads (tasks) may help each other to learn.

Generally any suitable loss function may be used to update the machine learning model(s) 108 during training. For example, a classification loss function such as multi-class cross-entropy loss or dice loss may be used for classification tasks, and/or a regression loss function such as L1 or L2 loss may be used for regression tasks.

In some embodiments that use an instance clustering head, an instance clustering loss function may be used, such as the example loss function defined in equation (5) below. Generally, assume for the sake of example that the goal is to encode, for each pixel, a representation of an assignment of the pixel to one of a plurality of available instance identifications (IDs) as a multinomial distribution with M elements:

$$P_i = [p_{i,1}, \cdots, p_{1,M}] \tag{1}$$

where M is the number of channels of a predicted output tensor (e.g., one confidence map per channel). While an entire scene may include some larger number of globally unique instances (e.g., 100), any particular cluster of pixels (local region) may belong to some smaller number of locally unique instances (e.g., 5-7), so the number of channels M may be chosen based on the number of locally unique instances to distinguish. For many segmentation tasks, 5-7 channels may be sufficient to distinguish among occluded and/or neighboring instances. Thus, each pixel may be assigned an M-dimensional probability distribution function, with each channel predicting a likelihood that each pixel belongs to a different locally unique instance. Thus, the goal may be to assign distributions to different pixels in such a way that pixels that belong to the same instance would have similar distributions (e.g., the maximum probability in any given dimension is the same or within some threshold of one another), and such that pixels that belong to different instances have different distributions.

To accomplish this, a similarity loss factor comparing two pixels may be defined using KL-divergence as:

$$L(i, j)_{similar} = D_{KL}(P_i \| P_j) + D_{KL}(P_j \| P_i), \quad (2)$$

$$\text{where } D_{KL}(P_i \| P_j) = \sum_{k=1}^{M} p_{i,k} * \log\left(\frac{p_{i,k}}{p_{j,k}}\right)$$

where $P_i$ and $P_j$ are probability distribution functions for pixels i and j, and KL divergence may be symmetric to avoid trivial solutions. The motivation for this similarity loss factor is that, for pixels that belong to the same instance, a loss function should guide their distributions to be similar, so the similarity loss is minimized for pixels that have the same distributions. Further, a dissimilarity factor comparing two pixels may be defined using a hinge-like loss as:

$$L(i, j)_{dissimilar} = H(D_{KL}(P_i \| P_j), \lambda) + H(D_{KL}(P_j \| P_i), \lambda), \quad (3)$$

$$\text{where } H(x, \lambda) = \max(0, \lambda - x)$$

where $\lambda$ is a hyper parameter that may be selected by design (e.g., typically 1 to flip KL divergence). The motivation for this dissimilarity loss factor is that, for pixels that belong to different instances, a loss function should guide their distributions to be different, so the dissimilarity loss factor is minimized for pixels that have the most different distributions. Finally, to trigger the proper loss term, an indicator function may be defined based on ground truth as:

$$S(i, j) = \quad (4)$$

$$\{1 \text{ if pixels } i \text{ and } j \text{ belong to the same instance}; 0 - \text{otherwise}\}$$

where ground truth annotations may be used to determine whether two pixels i and j belong to the same instance.

Thus, an instance clustering loss function may be defined by combining the similarity and dissimilarity loss terms:

$$L(i, j) = S(i, j) * L(i, j)_{similar} + (1 - S(i, j)) * L(i, j)_{dissimilar} \quad (5)$$

Such a loss term may serve to teach a machine learning model and/or the instance clustering head to predict similar distributions for similar pixels (e.g. in the same instance) and dissimilar distributions for dissimilar pixels (e.g., pixels from different instances). During training, the instance clustering loss may be combined with other losses from other tasks and/or task heads. However, in some situations, it may be computationally expensive to evaluate the instance clustering loss for each possible pair of predicted pixels. As such, in some embodiments, the instance clustering may be evaluated for only a random subset of N pairs of pixels. The number N may depend on the application of interest, resolution, and/or other factors. Using a randomly selected subset of pixel pairs, the process of updating the machine learning model and/or the instance clustering head (e.g., via backpropagation) may still result in updates to network weights that improve the network's ability to cluster and predict instance IDs.

In some embodiments, a total loss may be computed as a sum of classification loss(es), regression loss(es), and/or the instance clustering loss corresponding to the different tasks and/or task heads. In some embodiments, the contribution to the loss from the different tasks may be weighted with fixed weights and/or autoweights. Additionally or alternatively, classification loss may be weighted to counteract a class imbalance present in a training dataset. These and other variations may be implemented within the scope of the present disclosure.

Example Autonomous Vehicle

FIG. 10A is an illustration of an example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. For example, the vehicle 1000 may be capable of conditional automation (Level 3), high automation (Level 4), and/or full automation (Level 5), depending on the embodiment.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the HD map 1022 of FIG. 10C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024 which may use one or more wireless antenna(s) 1026 and/or modem(s) to communicate over one or more networks. For example, the network interface 1024 may be capable of communication over LTE, WCDMA, UMTS, GSM, CDMA2000, etc. The wireless antenna(s) 1026 may also enable communication between objects in the environment (e.g., vehicles, mobile devices, etc.), using local area network(s), such as Bluetooth, Bluetooth LE, Z-Wave, Zig-Bee, etc., and/or low power wide-area network(s) (LP-WANs), such as LoRaWAN, SigFox, etc.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may any number of wide-view cameras 1070 on the vehicle 1000. In addition, long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

One or more stereo cameras 1068 may also be included in a front-facing configuration. The stereo camera(s) 1068 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned to on the vehicle 1000. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068, infrared camera(s) 1072, etc.), as described herein.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000—such as processing DNNs. In addition, the SoC(s) 1004 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1012 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, that use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas 1026 (e.g., one or more wireless antennas for different communication protocols, such as a cellular antenna, a Bluetooth antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include a SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS, assisted GPS sensors, differential GPS (DGPS) sensors, etc.), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060 m (front) or 80 m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 1000 m, with an accuracy of 2 cm-3 cm, and with support for a 1000 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 120-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines microelectro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1000), while the I2V communication concept provides information about traffic further ahead. CACC systems may include either or both I2V and V2V information sources. Given the information of the vehicles ahead of the vehicle 1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may radios, disk players, navigation systems, video players, USB and Bluetooth connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 11:
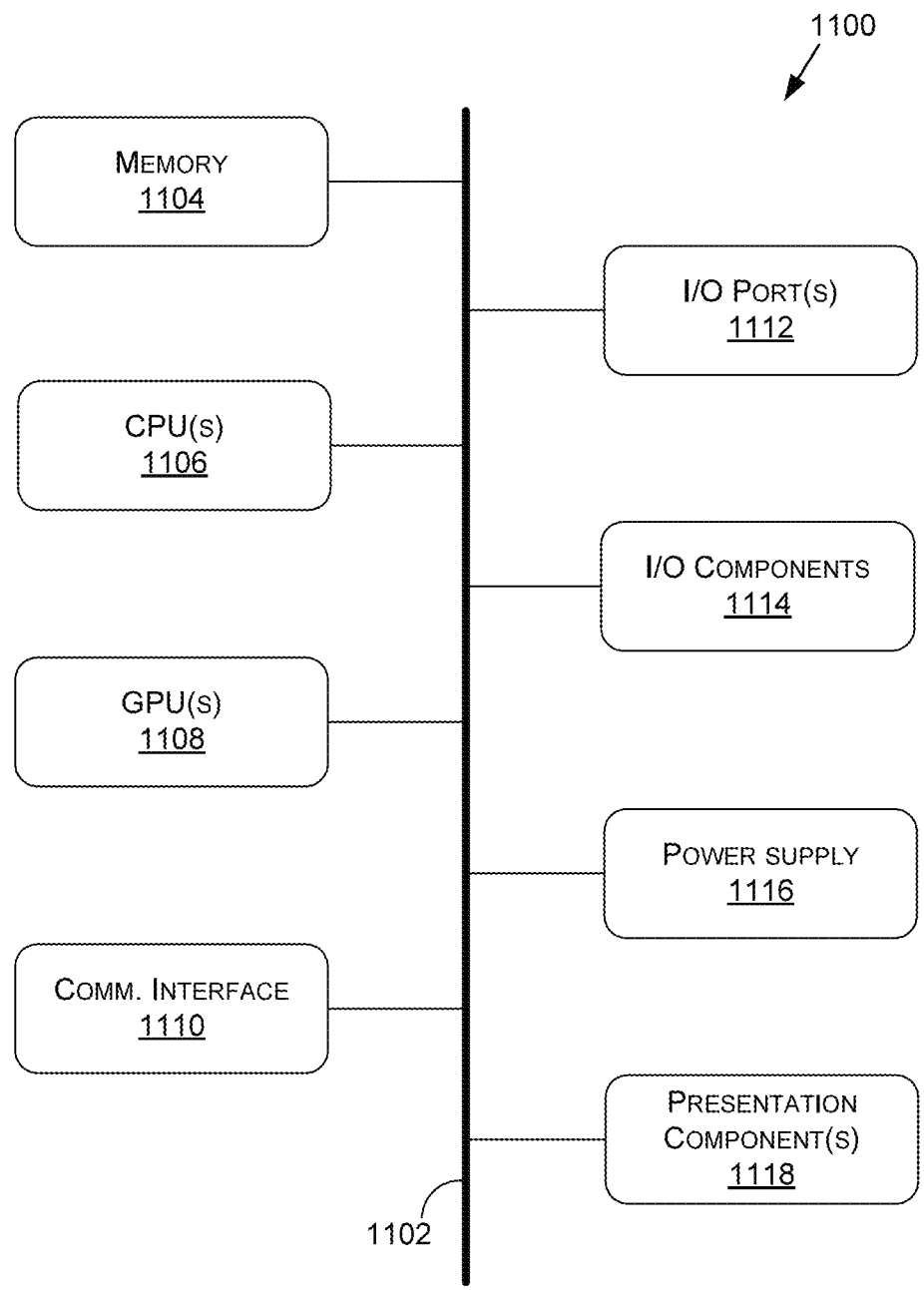
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, etc.), and output the data (e.g., as an image, video, sound, etc.).

Examples Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising processing circuitry to:
    generate, using a neural network and based at least on a representation of image data corresponding to an environment of an ego-object, one or more classifications of one or more pixels, the one or more classifications indicating associations of the one or more pixels with one or more unique instances corresponding to one or more respective channels of the neural network;
    generate, based at least on the one or more classifications, one or more bounding shapes of the one or more unique instances of one or more detected objects in the environment; and
    execute one or more operations of the ego-object based at least on the one or more bounding shapes.

2. The one or more processors of claim 1, wherein the neural network comprises an instance clustering head comprising a respective classification channel for each of a plurality of detectable unique instances.

3. The one or more processors of claim 1, wherein the one or more classifications comprise, for each channel of at least one of the one or more respective channels, a respective confidence map representing pixels that belong to a respective instance of the one or more unique instances.

4. The one or more processors of claim 1, wherein the processing circuitry is further to generate the one or more bounding shapes using a connected components analysis to detect one or more boundaries of one or more clusters of connected or occluded unique instances represented by the one or more classifications.

5. The one or more processors of claim 1, wherein the processing circuitry is further to identify a plurality of globally unique instances from each cluster of one or more clusters of connected or occluded unique instances detected from each classification channel of at least one of the one or more respective channels.

6. The one or more processors of claim 1, wherein the processing circuitry is further to identify a plurality of globally unique instances based at least on: using a connected components analysis to assign a plurality of disconnected regions to a first instance, and determining that the plurality of disconnected regions correspond to the plurality of globally unique instances based at least on a minimum separation between the disconnected regions.

7. The one or more processors of claim 1, wherein the one or more classifications comprise a depth-wise probability distribution per pixel representing a predicted likelihood, for each channel of a plurality of channels of the neural network, that each pixel of at least one of the one or more pixels belongs to a respective unique instance corresponding to the channel.

8. The one or more processors of claim 1, wherein the processing circuitry is further to identify at least one unique instance of the one or more unique instances based at least on joining distinct connected regions of the one or more classifications, that are separated by less than a threshold gap, into a composite region representing the at least one unique instance.

9. The one or more processors of claim 1, wherein using the neural network performs panoptic segmentation comprising class segmentation and instance regression in a single pass of the neural network.

10. The one or more processors of claim 1, wherein the one or more processors are comprised in at least one of:
   a control system for an autonomous or semi-autonomous machine;
   a perception system for an autonomous or semi-autonomous machine;
   a system for performing simulation operations;
   a system for performing deep learning operations;
   a system for performing remote operations;
   a system for performing real-time streaming;
   a system for generating or presenting one or more of augmented reality content, virtual reality content, or mixed reality content;
   a system implemented using a robot;
   a system for generating synthetic data;
   a system for generating synthetic data using AI; or
   a system implemented at least partially using cloud computing resources.

11. A system comprising one or more processors to:
   generate, using a neural network and based at least on a representation of sensor data corresponding to an environment of an ego-object, one or more classifications associating one or more pixels with one or more unique instances corresponding to one or more respective channels of the neural network; and
   execute one or more operations of the ego-object based at least on the one or more classifications.

12. The system of claim 11, wherein the neural network comprises an instance clustering head comprising a respective classification channel for each of a plurality of detectable unique instances.

13. The system of claim 11, wherein the one or more classifications comprise, for each channel of at least one of the one or more respective channels, a respective confidence map representing pixels that belong to a respective instance of the one or more unique instances.

14. The system of claim 11, wherein the one or more processors are further to generate one or more bounding shapes of the one or more unique instances using a connected components analysis to detect one or more boundaries of one or more clusters of connected or occluded unique instances represented by the one or more classifications.

15. The system of claim 11, wherein the one or more processors are further to identify a plurality of globally unique instances from each cluster of one or more clusters of connected or occluded unique instances detected from each classification channel of at least one of the one or more respective channels.

16. The system of claim 11, wherein the one or more processors are further to identify a plurality of globally unique instances based at least on: using a connected components analysis to assign a plurality of disconnected regions to a first instance, and determining that the plurality of disconnected regions correspond to the plurality of globally unique instances based at least on a minimum separation between the disconnected regions.

17. The system of claim 11, wherein the one or more classifications comprise a depth-wise probability distribution per pixel representing a predicted likelihood, for each channel of a plurality of channels of the neural network, that each pixel of at least one of the one or more pixels belongs to a respective unique instance corresponding to the channel.

18. The system of claim 11, wherein the system is comprised in at least one of:
   a control system for an autonomous or semi-autonomous machine;
   a perception system for an autonomous or semi-autonomous machine;
   a system for performing simulation operations;
   a system for performing deep learning operations;
   a system for performing remote operations;
   a system for performing real-time streaming;
   a system for generating or presenting one or more of augmented reality content, virtual reality content, or mixed reality content;
   a system implemented using a robot;
   a system for generating synthetic data;
   a system for generating synthetic data using AI; or
   a system implemented at least partially using cloud computing resources.

19. A method comprising:
   generate, based at least on using a neural network to process a representation of sensor data corresponding to an environment of an ego-object, one or more classifications of one or more pixels into one or more unique instances corresponding to one or more respective channels of the neural network; and
   execute one or more operations of the ego-object based at least on the one or more classifications.

20. The method of claim 19, wherein the method is performed by at least one of:
   a control system for an autonomous or semi-autonomous machine;
   a perception system for an autonomous or semi-autonomous machine;
   a system for performing simulation operations;
   a system for performing deep learning operations;
   a system for performing remote operations;
   a system for performing real-time streaming;
   a system for generating or presenting one or more of augmented reality content, virtual reality content, or mixed reality content;

a system implemented using a robot;
a system for generating synthetic data;
a system for generating synthetic data using AI; or
a system implemented at least partially using cloud computing resources.

* * * * *